US005528587A

United States Patent [19]
Galand et al.

[11] Patent Number: 5,528,587
[45] Date of Patent: Jun. 18, 1996

[54] PROGRAMMABLE HIGH PERFORMANCE DATA COMMUNICATION ADAPTER FOR HIGH SPEED PACKET TRANSMISSION NETWORKS

[75] Inventors: Claude Galand, Cagnes-Sur-Mer; Gerald Lebizay, Vence; Daniel Mauduit, Nice; Jean-marie Munier, Cagnes-Sur-Mer; Andre Pauporte, La Colle-Sur-Loup; Eric Saint-Georges, La Gaude; Victor Spagnol, Cagnes-Sur-Mer, all of France

[73] Assignee: International Business Machines Corporation, Armonk, N.Y.

[21] Appl. No.: 252,299

[22] Filed: Jun. 1, 1994

[30] Foreign Application Priority Data

Jun. 30, 1993 [EP] European Pat. Off. .............. 93480087

[51] Int. Cl.⁶ .............................. H04J 3/02; H04L 12/56
[52] U.S. Cl. .................... 370/60; 364/238.9; 395/200.02
[58] Field of Search ........................... 370/60, 58.1, 58.2, 370/58.3, 61, 85.13, 92, 94.1, 99; 364/238.1, 238.2, 238.3, 238.4, 238.5, 238.6, 239, 239.3, 239.4, 239.5, 239.51, 239.8, 239.9, 242.94, 242.95, 242.96, 242.97; 395/200, 250, 275, 325, 375, 425, 400

[56] References Cited

FOREIGN PATENT DOCUMENTS 0433520  6/1991  European Pat. Off. .......... G06F 5/06

OTHER PUBLICATIONS

Fujitsu–Scientific & Tech. Journal, vol. 23, No. 4, pp. 201–215 Dec./1987 "The Development Concept and Hardware Architecture of the ACOM M–780 Model group", Tone et al.

IBM TDB, vol. 33, No. 7, pp. 351–354. Dec./1990 "Queueing problem avoidance by using finite resource list".
Int. Conf. on Computer Design, 10–87, pp. 100–106, French et al., "An Eight Channel Synchronous Data controller for a primary rate Interface to ISDN".
SIGMOD'88, 8–88, pp. 134–145, Song et al, "Optimizing Bulk data Transfer performance: A packet Train Approach".
COMPCON '83, 3–83, pp. 510–517, Stark et al, "A High Functionality VLSI Ian controller for CSMA/CD Network".

*Primary Examiner*—Wellington Chin
*Assistant Examiner*—Huy D. Vu
*Attorney, Agent, or Firm*—Stephen T. Keohane; Joscelyn G. Cockburn

[57] ABSTRACT

A high performance data packet buffering method and a programmable data communication adapter for high speed packet transmission networks are disclosed. The line adapter includes programmable processing means, for receiving and transmitting data packets of fixed or variable length. This system is characterized in that it comprises means for buffering (132) said data packets,
means for identifying said buffering means and said data packets in said buffering means,
means for queueing (FIG. 15) in storing means (131) said identifying means in a single instruction,
means for dequeueing (FIG. 16) from said storing (131) means said identifying means in another single instruction,
means for releasing said buffering means, Each instruction comprises up to three operations executed in parallel by said processing means:
an arithmetical and logical (ALU) operation on said identifying means,
memory operation on said storing means, and
a sequence operation.

14 Claims, 16 Drawing Sheets

PROGRAMMABLE HIGH PERFORMANCE ADAPTER

TRAFFIC ROUTING THROUGH THE SWITCH

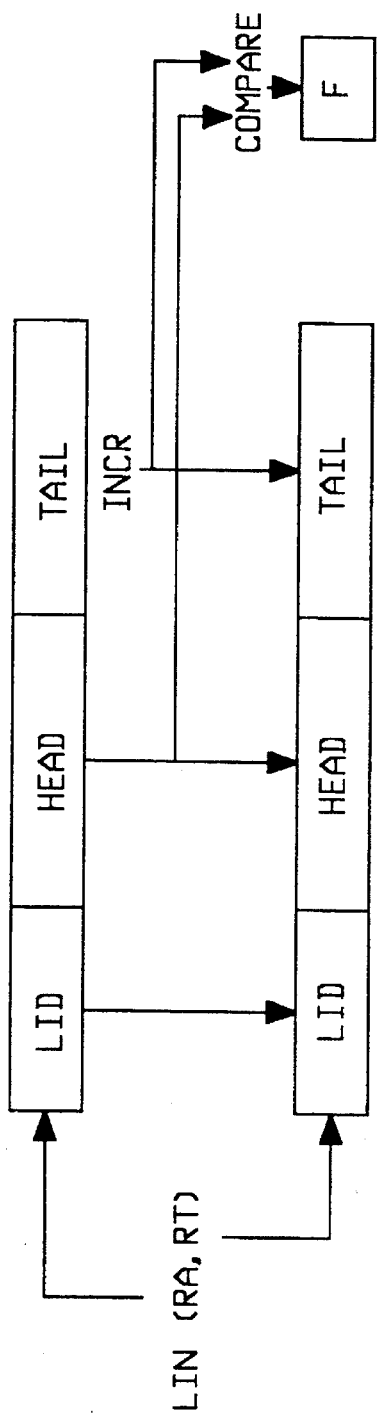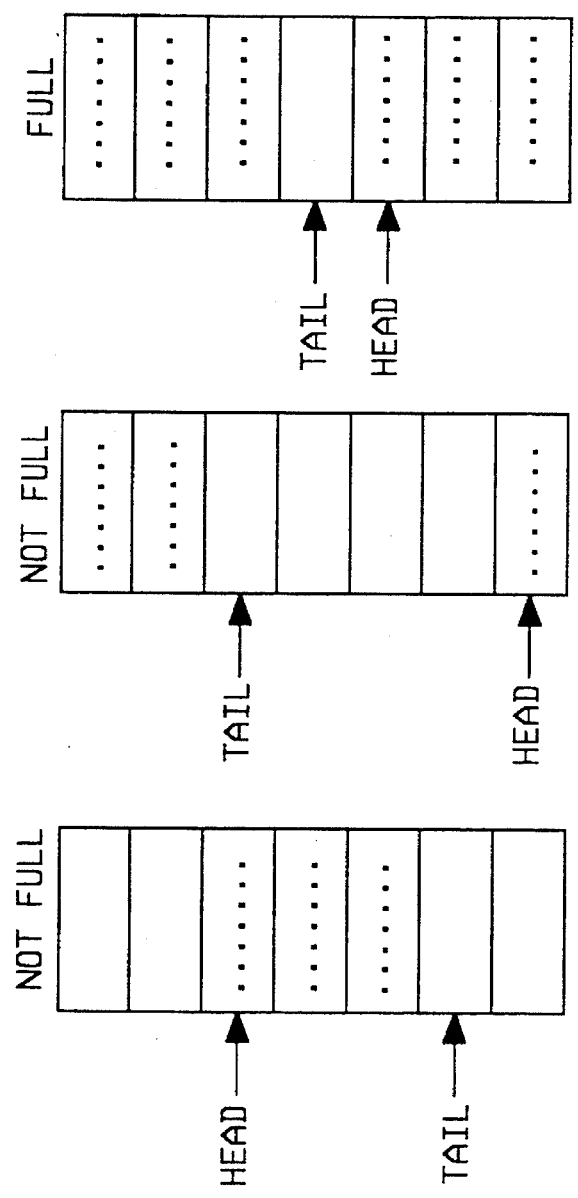
FIGURE 10

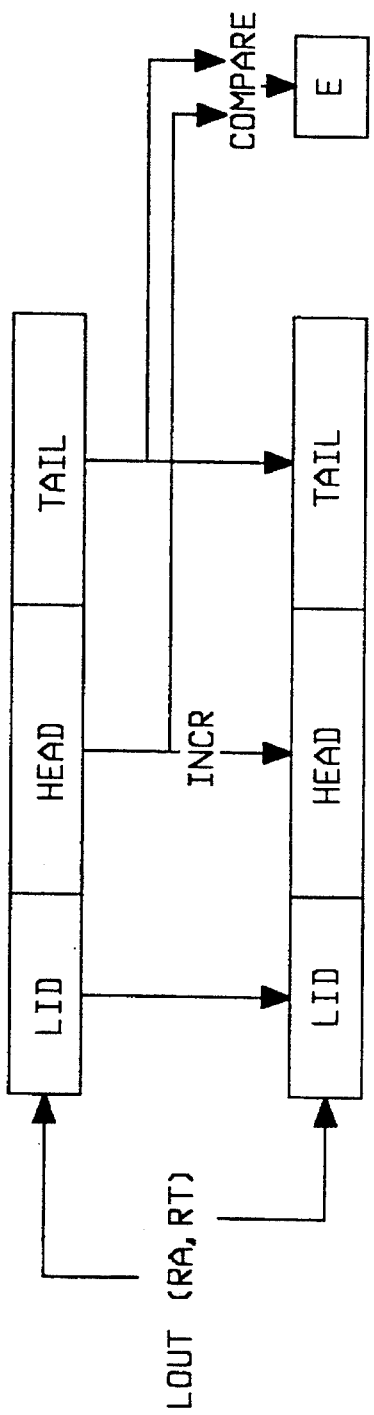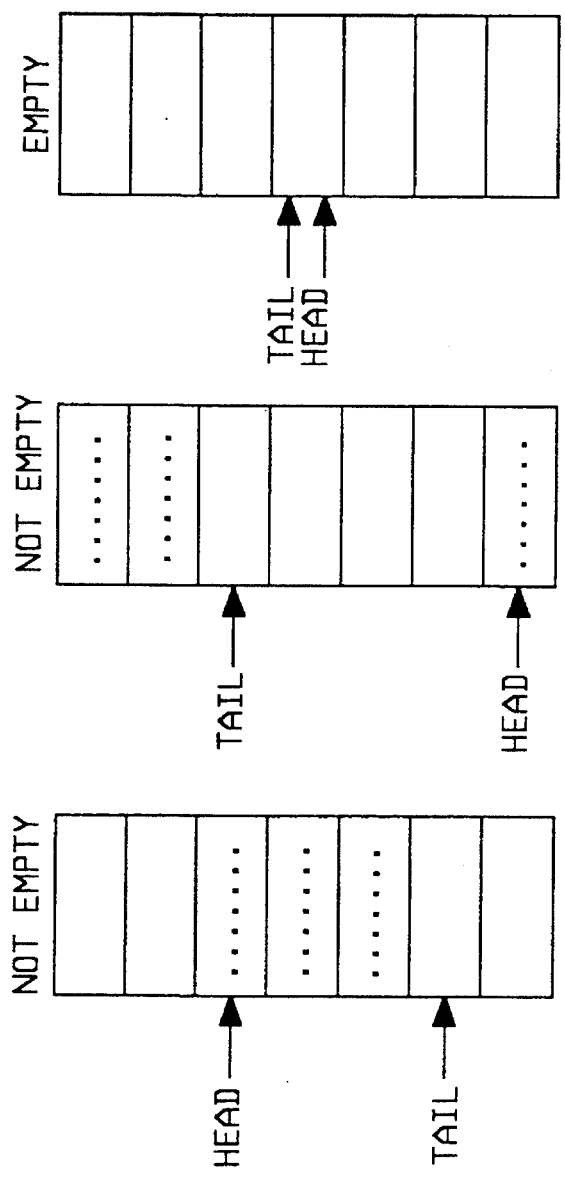
FIGURE 11

SPECIFIC PURPOSE PROCESSOR FUNCTIONAL STRUCTURE

PROGRAMMABLE HIGH PERFORMANCE DATA COMMUNICATION ADAPTER FOR HIGH SPEED PACKET TRANSMISSION NETWORKS

TECHNICAL FIELD

The present invention relates to a high performance packet buffering system and method in a programmable data communication adapter of a packet switching node of a high speed network.

BACKGROUND

Technical and Market Trends

The telecommunication environment is in full evolution and has changed considerably this recent years. The principal reason has been the spectacular progress realized in the communication technology:

- the maturing of fiber optical transmission. High speed rates can now be sustained with very low bit error rates.
- the universal use of digital technologies within private and public telecommunications networks.

In relation with these new emerging technologies, the offer of the telecommunication companies, public or private, are evolving:

- The emergence of high speed transmissions entails an explosion in the high bandwidth connectivity.
- the increase of the communication capacity generates more attractive tariffs.
- A higher flexibility is offered to the users to manage their growth through a wide range of connectivity options, an efficient bandwidth management and the support of new media.
- Once sampled and digitally encoded, voice, video and image derived data can be merged with pure data for a common and transparent transport.

Abundant, cheap communications means that many potential applications that where not possible before because of cost are now becoming attractive. In this environment, four generic requirements are expressed by the users:

- Doing old applications better,
- Optimizing communication networks,
- Doing new applications.

High Performance Networks

In a first step, T1 backbone networks were primarily deployed with TDM (Time Division Multiplexing) technology to achieve cost savings through line aggregation. These systems easily supported the fixed bandwidth requirements of host/terminal computing and 64 Kbps PCM (Pulse Code Modulation) voice traffic.

The data transmission is now evolving with a specific focus on applications and by integrating a fundamental shift in the customer traffic profile. Driven by the growth of workstations, the local area networks (LAN) interconnection, the distributed processing between workstations and super computers, the new applications and the integration of various and often conflicting structures—hierarchical versus peer to peer, wide (WAN) versus local (LAN) area networks, voice versus data—the data profile has become higher in bandwidth, bursting, non deterministic and requires more connectivity. Based on the above, it is clear that there is strong requirement to support distributed computing applications across high speed backbones that may be carrying LAN traffic, voice, video, and traffic among channel attached hosts, business work-stations, engineering work-stations, terminals, and small to intermediate file servers. This traffic reflects a heterogeneous mix of:

- end user network protocols including Ethernet, Tocken Ring, APPN, FDDI, OSI, ISDN, ATM . . . , and
- real time (steady stream traffic such as voice and video) and non real time (bursty nature traffic such as interactive data) transmissions.

This vision of a high speed protocol-agile backbone network is the driver for the emergence of fast packet switching networks architectures in which data, voice, and video information is digitally encoded, chopped into small packets and transmitted through a common set of nodes and links. Although low speed links may exist, the availability of fiber optic links will make cost effective to have a few links of high speed rather that many links of low speed. In addition to the high speed backbone, there exists a peripheral network which essentially provides access to the switching nodes. This peripheral network is composed of relatively low speed links which may not use the same protocols or switching techniques used in the backbone. In addition, the peripheral network performs the task of multiplexing the relatively slow end users traffic to the high speed backbone. Thus, backbone switching nodes are principally handling high speed lines. The number of high speed links entering each switching node is relatively small but the aggregate throughput very high in the Giga-bits per second range.

Throughput

The key requirement of these new architectures is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. As example, for meeting a typical 100 ms delay to deliver a voice packet between two end users:

- A total of 36 ms might be needed for the packetization and play-out functions at the end points.
- About 20 ms is the unalterable propagation delay needed, say, to cross the United States.
- There remains 44 ms for all the intra-node processing time as the packet moves through the network. In a 5 nodes network, each node would have about 8 ms for all processing time including any queueing time. In a 10 nodes network, each node would have about 4 ms.

Another way of looking the same constraint is illustrated in FIG. 1: taking a node with an effective processing rate of 1 MIPS (Millions of Instructions Per Second), it is possible to fill a 9.6 kbps line with 1000 byte packets even if a network node must execute 833 000 instructions per packet processed. For a 64 kbps line the node can afford 125 000 instructions per packet. In order to fill an OC24 link, however, our 1 MIPS node could only execute 7 instruction per packet I In the latter case even an effective rate of 10–30 MIPS would allow only 70–200 instructions per packet.

In order to minimize the processing time and to take full advantage of the high speed/low error rate technologies, most of the transport functions provided by the new high bandwidth network architectures are performed on an endto-end basis. This includes the flow control and error recovery for data, the packetization and reassembly for voice and video. The protocol is simplified:

First, there is no need for transit node to be aware of individual (end user to end user) transport connections.

Secondly high performance and high quality links does not require any more node to node error recovery or retransmission. Congestion and and flow control are managed at the access and end points of the network connections reducing both the awareness and the function of the intermediate nodes.

Packet Size

Blocks of user data offered for transmission vary widely in size. If these blocks are broken up into many short "packets" then the transit delay for the whole block across the network will be considerably shorter. this is because when a block is broken up into many short packets, each packet can be processed by the network separately and the first few packets of a block may be received at the destination before the last packet is transmitted by the source.

Limiting all data traffic to a small maximum length also has the effect of smoothing out queueing delays in intermediate nodes and thus providing a much more even transit delay characteristic than is possible if blocks are allowed to be any length. Another benefits to short packets, for example, is to manage easier a pool of fixed length buffers in an intermediate node if it is known that each packet will fit in just one buffer and if packets are short and delivered at a constant, relatively even rate then the amount of storage needed in the node buffer pool is minimized.

However, there is a big problem with short packet sizes. It is a characteristic of the architecture of traditional packet switching nodes that switching a packet takes a certain amount of time or number of instructions regardless of the length of the packet. That is, a 1000 bytes block requires almost the same node resource to switch as does a 100 bytes block. So if you break a 1000 bytes packet up into 10, 100 bytes packets then you multiply the load on an intermediate switching node by 10. This effect was not too critical when nodes were very fast and links were very slow. Today, when links are very fast and nodes are relatively slow, this characteristic is a significant limitation on network throughput.

Short packets are more suitable for the transmission of real time data, like voice or video packets, which must be delivered to the receiver at a steady, uniform rate (isochronous mode). An elegant solution to both the transit delay and error recovery problems is to use very short packets of fixed length. Furthermore, this technology simplifies (and therefore speeds up) the switching hardware needed in nodal switches. For example, the ATM standard (Asynchronous Transfer Mode) is using data cell size of 48 bytes (a cell being a packet of fixed length), only the routing header (5 bytes) is checked for validity and the data within the cell is left to the end-to-end protocol that means to a "higher layer" protocol managed by the application.

In another side, pure data are generated in a very bursty and non deterministic manner but does not have a problem with transit delay. This data can be delayed without necessarily degrading the quality of the information presented to an end user at the destination. The longer the packet is, the fewer packets per second must be switched for a given data throughput. However, the non predictable character of the traffic usually requires a heavy handling of buffers and queues at the expense of the response time.

In order to take full advantage of the different data packet transmission systems, the data transfer across the network must be done with packets of nearly the same size as the user packets without processing them into artificial lengths. As opposed to solely data networks or solely voice or video networks, the high speed network architectures have to support a plurality of heterogeneous transmission protocols operating with variable length packets.

Connectivity

In a high speed network, the nodes must provide a total connectivity. This includes attachment of the customer's devices, regardless of vendor or protocol, and the ability to have the end user communicate with any other device. Traffic types include data, voice, video, fax, graphic, image. The node must be able to take advantage of all common carrier facilities and to be adaptable to a plurality of protocols: all needed conversions must be automatic and transparent to the end user. For example, a high speed node must not have any dependencies on the existence of SNA (System Network Architecture) equipments on a user network. It has to be able to offer a similar level of service in a SNA environment as in a non-SNA environment made of routers, Private Branch exchanges (PBXs), Local Area Networks (LAN).

Key requirements

The efficient transport of mixed traffic streams on very high speed lines means for each communication node of the network a set of requirements in term of performance which can be summarized as follows:

a very short packet processing time, a very high throughput, an efficient queue and buffer management, limited number of instructions per packet, a very large flexibility to support a wide range of connectivity options.

The high bandwidth dictates the need of specialized hardware to support very fast packet handling and control protocols, and to satisfy the real time transmission needs of the voice and video traffic. The processing time being the main bottleneck in high speed networks, most of the communication nodes today are built around high speed switching hardware to off-load the routing packet handling and routing functions from the processor.

However, on equal performances, a software approach represents the most adequate solution for each node to meet the connectivity and flexibility requirements and to optimize the manufacturing and adaptation costs. The line adapters, are based on a common hardware design and are configured by means of a specific programming to execute either the access point or inter nodal transport functions. The adaptability of the adapters to support different access protocols and data streams—Frame Relay, HDLC (High level Data Link Control), CBO (Continuous Bit Operations), ATM (Asynchronous Transfer Mode), . . . —is provided by logical components called Access Agents. Such logical associations Adapter/Access Agent are specified by software, providing a very large flexibility at a reduced cost. Each line adapter is automatically configured at system initiation according to:

the adapter function, and the access protocol.

SUMMARY OF THE INVENTION

In accordance with the present invention, a high performance packet buffering method and a programmable data communication adapter system are disclosed. The line adapter includes programmable processing means, for receiving and transmitting data packets of fixed or variable length. This system is characterized in that it comprises means for buffering (132) said data packets, means for identifying said data packets in said buffering means, means for queueing (FIG. 15) in storing means (131) said identifying means in a single instruction, means for dequeueing (FIG. 16) from said storing (131) means said identifying means in another single instruction, means for releasing said buffering means, Each instruction comprises up to three operations executed in parallel by said processing means:

an arithmetical and logical (ALU) operation on said identifying means, a memory operation on said storing means, and a sequence operation.

DESCRIPTION OF THE DRAWINGS

FIG. 10 illustrates the List_IN operation according to the present invention.

FIG. 11 illustrates the List_OUT operation according to the present invention.

DESCRIPTION OF THE PREFERRED EMBODIMENT OF THE INVENTION

Figure 1:
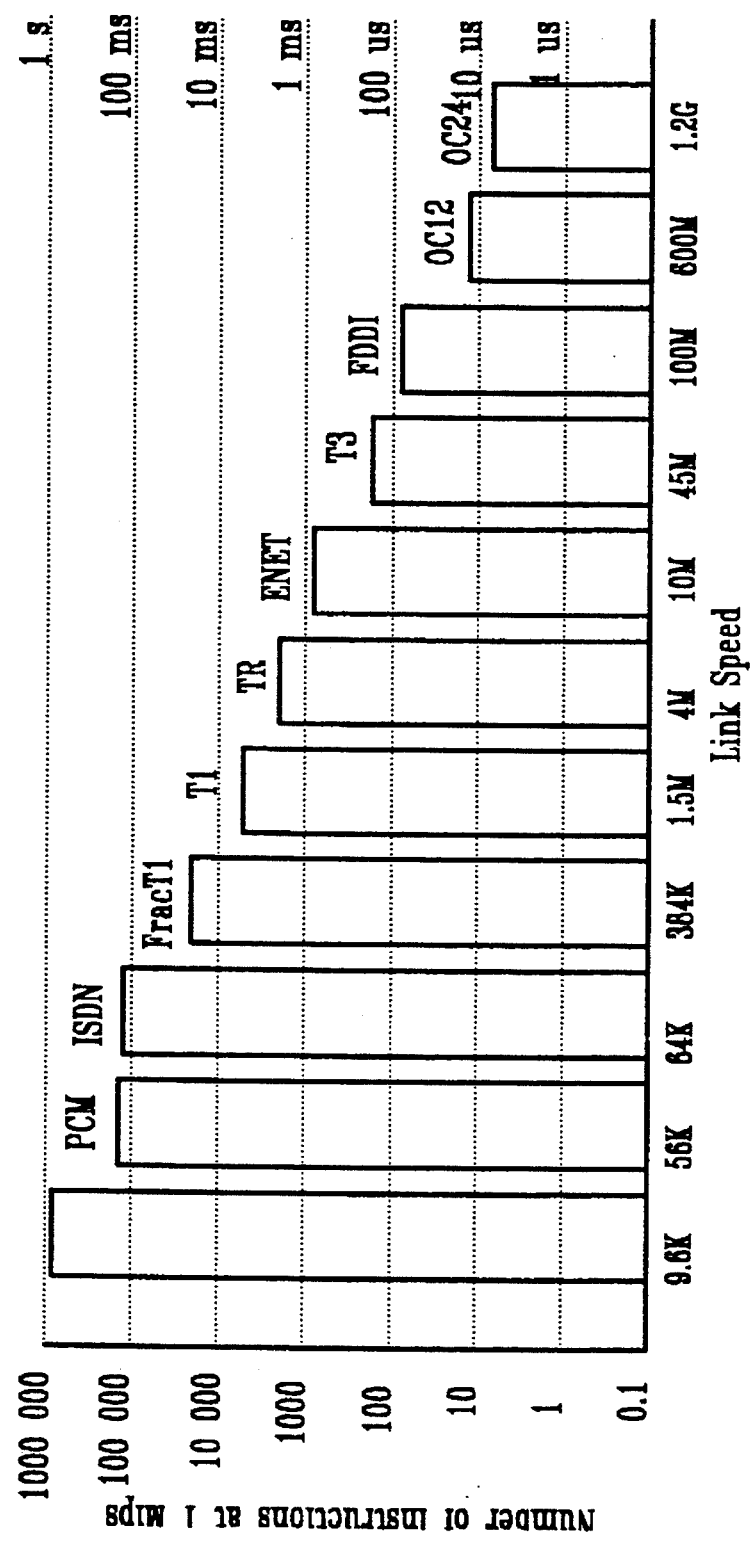
FIG. 1 shows the processing times (or number of instructions per second) required in function of the different line throughputs supported by the present invention.
Figure 2:
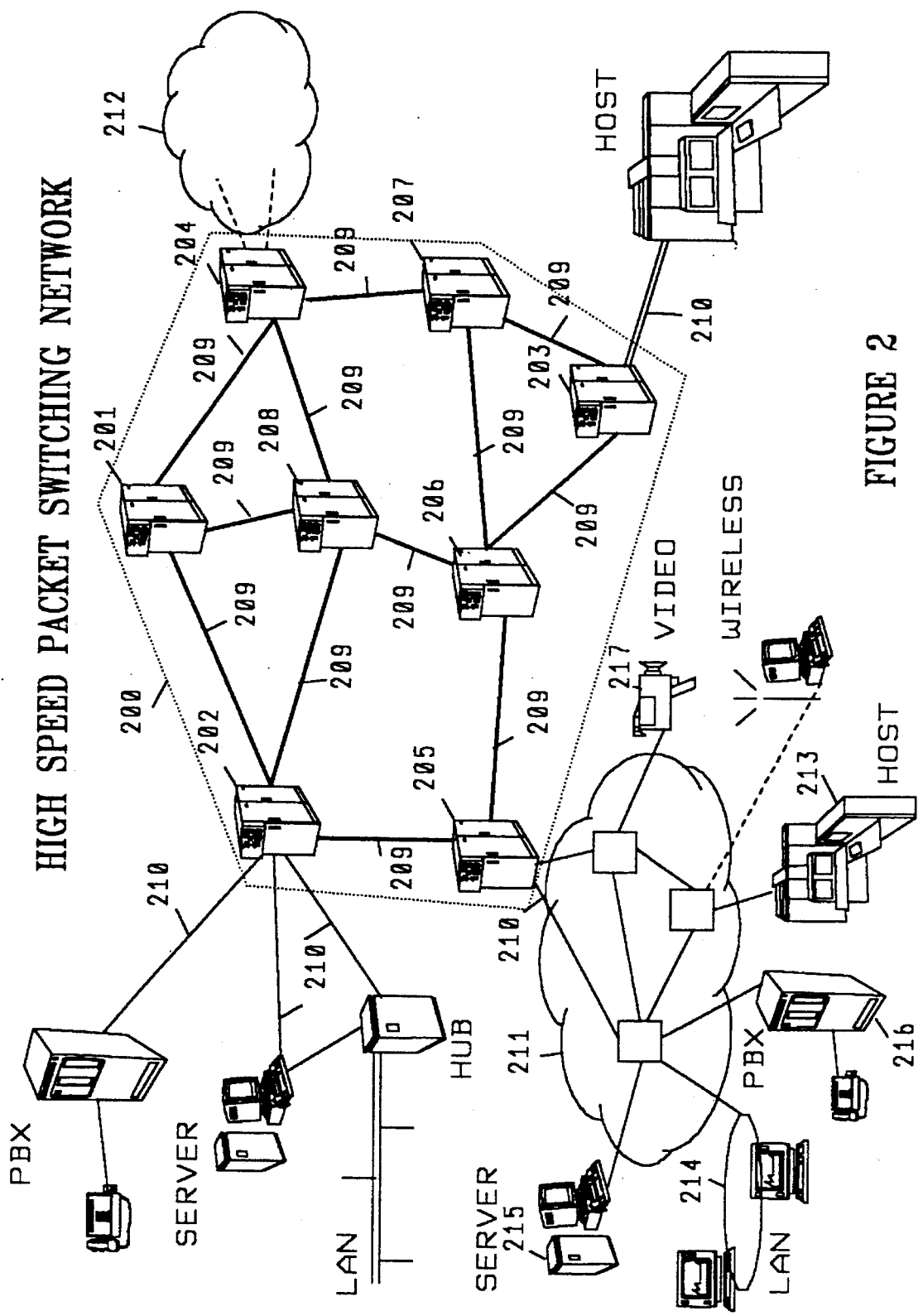
FIG. 2 shows a typical model of high speed packet switching network including the access and transit nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as Enterprise Servers (213), user groups using workstations or personnel computers attached on LAN (Local Area Networks 214), applications servers (215), PBX (Private Branch exchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

High speed packet switching networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch exchange (PBX), an application server and a hub through three Ports and communicates through the network by means of the adjacent Transit Nodes 201, 208 and 205.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Each Port is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This header is made of Control and Routing Fields.

The Routing Fields contain all the information necessary to route the packet through the network (200) to the destination End Node to which it is addressed.

The Control Fields include, among other things, an encoded identification of the protocol to be used in interpreting the Routing Field.

Routing Points

Figure 3:
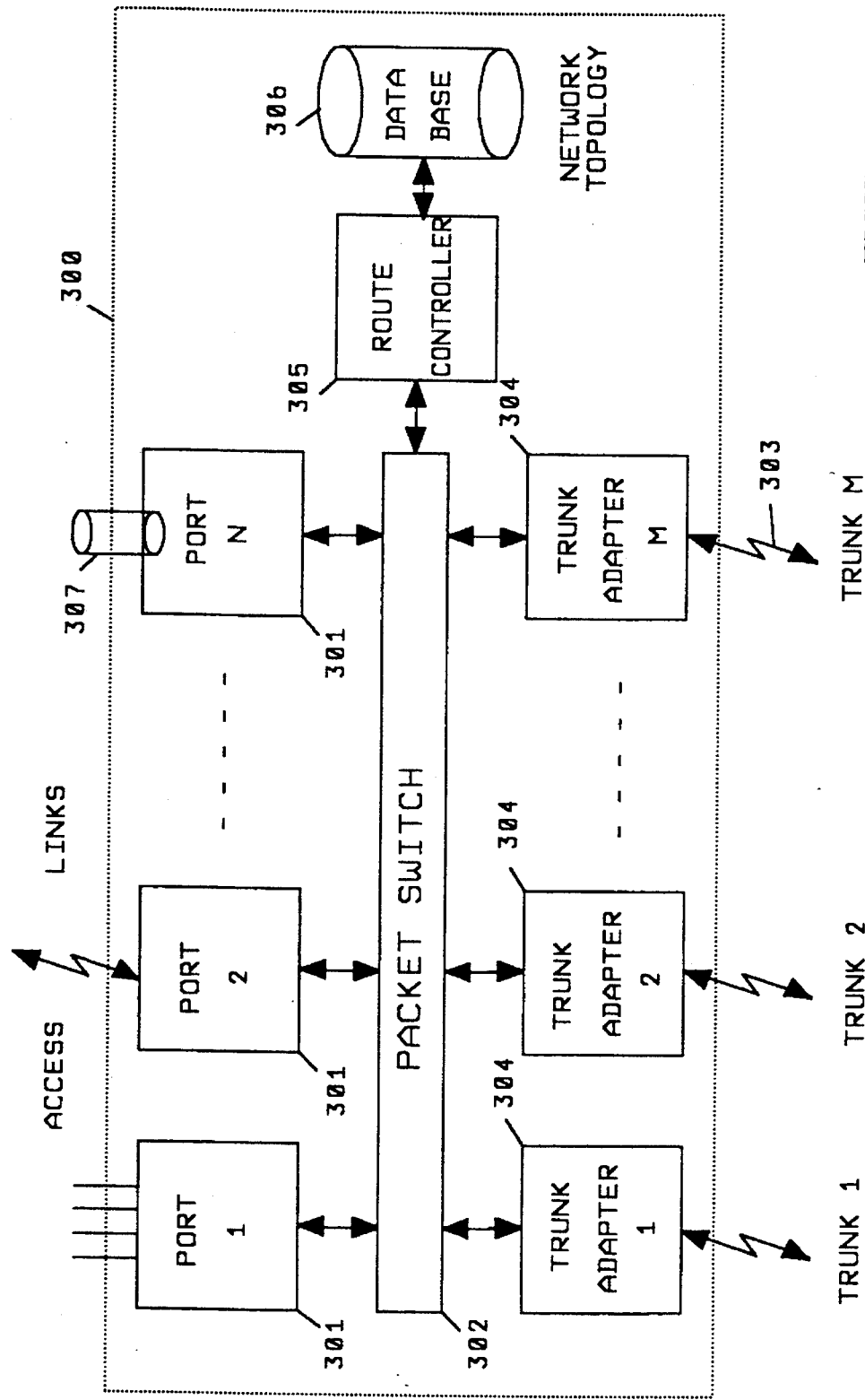
FIG. 3 describes a high speed Routing Point according to the present invention.

FIG. 3 shows a general block diagram of a typical Routing Point (300) such as it can be found in the network Nodes (201 to 208) illustrated in FIG. 2. A Routing Point comprises a high speed packet Switch (302) onto which packets arriving at the Routing Point are entered. Such packets are received:

from other nodes over high speed transmission links (303) via Trunk Adapters (304).

from users via application adapters called Ports (301).

Using information in the packet header, the adapters (304, 301) determine which packets are to be routed by means of the Switch (302) towards a local user network (307) or towards a transmission link (303) leaving the Node. The adapters (301 and 304) include queuing circuits for queuing packets prior to or subsequent to their launch on the Switch (302).

The Route Controller (305) calculates the optimum routes through the network (200) so as to minimize the amount of network resources used to complete a communication path and builds the header of the packets generated in the Routing Point. The optimization criteria includes the characteristics of the connection request, the capabilities and the utilization of the Trunks in the path, the number of intermediate nodes . . . All the information necessary for the routing, about the nodes and transmission links connected to the nodes, are contained in a Network Topology Database (306). Under steady state conditions, every Routing Point has the same view of the network. The network topology information is updated when new links are activated or new nodes added to the network. Such information is exchanged by means of control messages with all other Route Controllers to provide the necessary up-to-date information needed for route calculation (such database updates are carried on packets very similar to the data packets between end users of the network). The fact that the network topology is kept current in every node through continuous updates allows dynamic network reconfigurations without disrupting end users logical sessions The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Ports and Trunk Adapters

Adapters Function

Ports are located at the boundary of the high speed network. They allow terminal equipments to exchange information through the high speed network without the need for knowing the specific high speed protocol used. The main function of the Ports are:

receiving foreign protocol data units from an external resource and forwarding them as high speed packets over the network to a target Port, and converting high speed packets back to foreign protocol data units and sending them to the target resource, controlling the bandwidth.

Note: the source and target Ports may be located in the same node.

Trunks are the links between the high speed network nodes. They carry high speed packets. Each Trunk manage its link bandwidth and link status. A critical task of the Trunks is the management of traffic priorities and allocation of internal buffers to reduce delay and congestion.

In addition, there is a special type of adapter called Route Controller Adapter (305) which:

communicates with the other adapters (301, 304) through the Switch (302), implements the centralized functions of the Route Controller such as the topology, the path selection . . . , establishes, maintains and cancels end-to-end high speed connections.

Adapters Architecture

Several techniques for designing said Ports, Trunk and Route Controller Adapters, to obtain more or less flexible and efficient transmission systems. Most of the adapters today are built around a specialized hardware depending on the function and protocol of the connected links.

The present invention, to satisfy the previously enumerated connectivity and flexibility requirements, provides a software solution based on a common hardware structure. Port and Trunk Adapters present the same architecture and their functional differentiation is realized through a specific programming. However, even using the most efficient general purpose microprocessor today available on the market, the experience shows that it is very difficult to reach the desired level of performance in term of number of switched packet per second. This is the reason why the control of each adapter has been shared between two processors: a Specific Purpose Processors (SPP, 406, 412), optimized for the packet switching and a General Purpose Processor (GPP, 409), the first dealing with the packet to be switched, the critical processing in term of performance, and the second with the adapter management.

Figure 4:
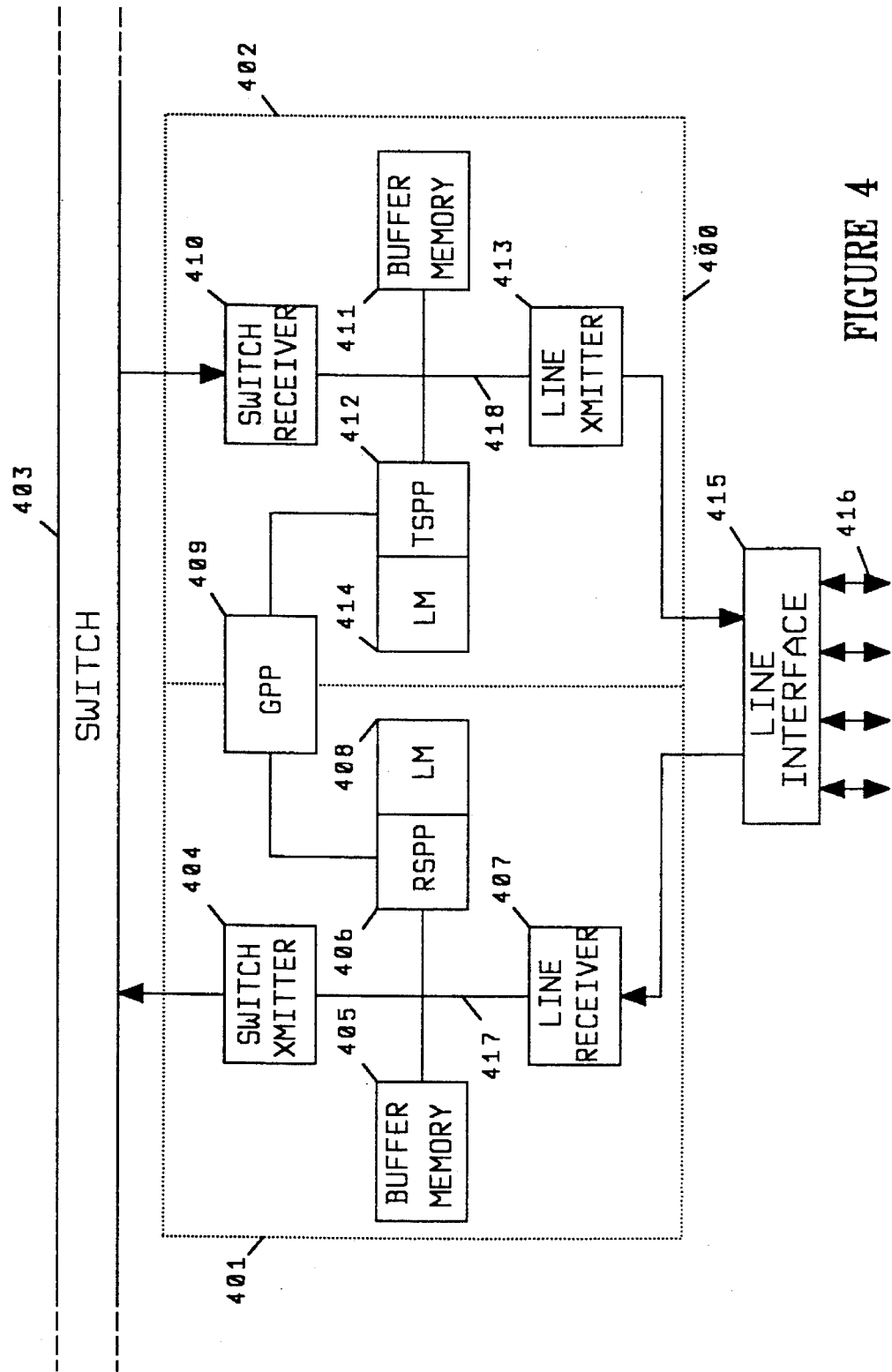
FIG. 4 shows a programmable high performance adapter as claimed in the present invention.

As shown in FIG. 4, each adapter (400) comprises the following logic components:

1. A General Purpose Processor (GPP, 409) whose programming depends of the selected Port or Trunk Adapter function. The GPP implements the adapter control operations.

2. A Receive Adapter (401) for implementing three functions:

the checking of the high speed packets header.

the traffic discrimination according to the routing mode specified in the header of every incoming packet, the routing of the incoming packets through the Switch (403) with the appropriate header.

The Receive Adapter includes:

a. a Line Receiver (407) for handling the data movements between a Line Interface (415) and a Receive Buffer Memory (RBM, 405).

b. a Receive Buffer Memory (RBM, 405) to temporarily store users data packets.
c. a Receive Specific Purpose Processor (RSPP, 406) based on a specialized microprocessor comprising a Local Memory (LM, 408). The RSPP handles the received steady state packet flow and forwards the control packets to the General Purpose Processor (409).
d. a Local Memory (LM, 408) used by the RSPP (406) as work space.
e. a Switch Transmitter Adapter (404) for handling the data flow transferred from the buffer Memory (RBM, 405) under the control of the Receive Specific Purpose Processor (406)

segmenting this flow in fixed length cells and, generating an appropriate switch routing header 3. a Transmit Adapter (402) for implementing the following functions:
   the reception of the data flow from the Switch (403),
   the checking of the cells header.
   the reassembly in packets (Port),
   the Trunk functions (Trunk adapter),
   the routing.

The Transmit Adapter includes:
a. a Switch Receiver (410) for handling the flow coming from the Switch (403) and transferring it to the Buffer Memory for reassembly.
b. a Transmit Specific Purpose Processor (XSPP, 412) similar to the Receive Specific Purpose Processor (406). The XSPP handles the steady state data and forwards the control flow to the General Purpose Processor (GPP, 409).
c. a Line Transmitter Adapter (413) for handling the data movements between the Buffer Memory (411) and the Line Interface (415).

The adapters are connected on one side on the packet Switch and on the other side on the Line Interfaces:

The Line Interfaces (415) are used to adapt the Port and Trunk Adapter physical interfaces to the appropriate media.

The packet Switch (302, 403) allows the Route Controller (305) and the different Ports (301), Trunk Adapters (304) to communicate.

Data Flow Control

Figure 5:
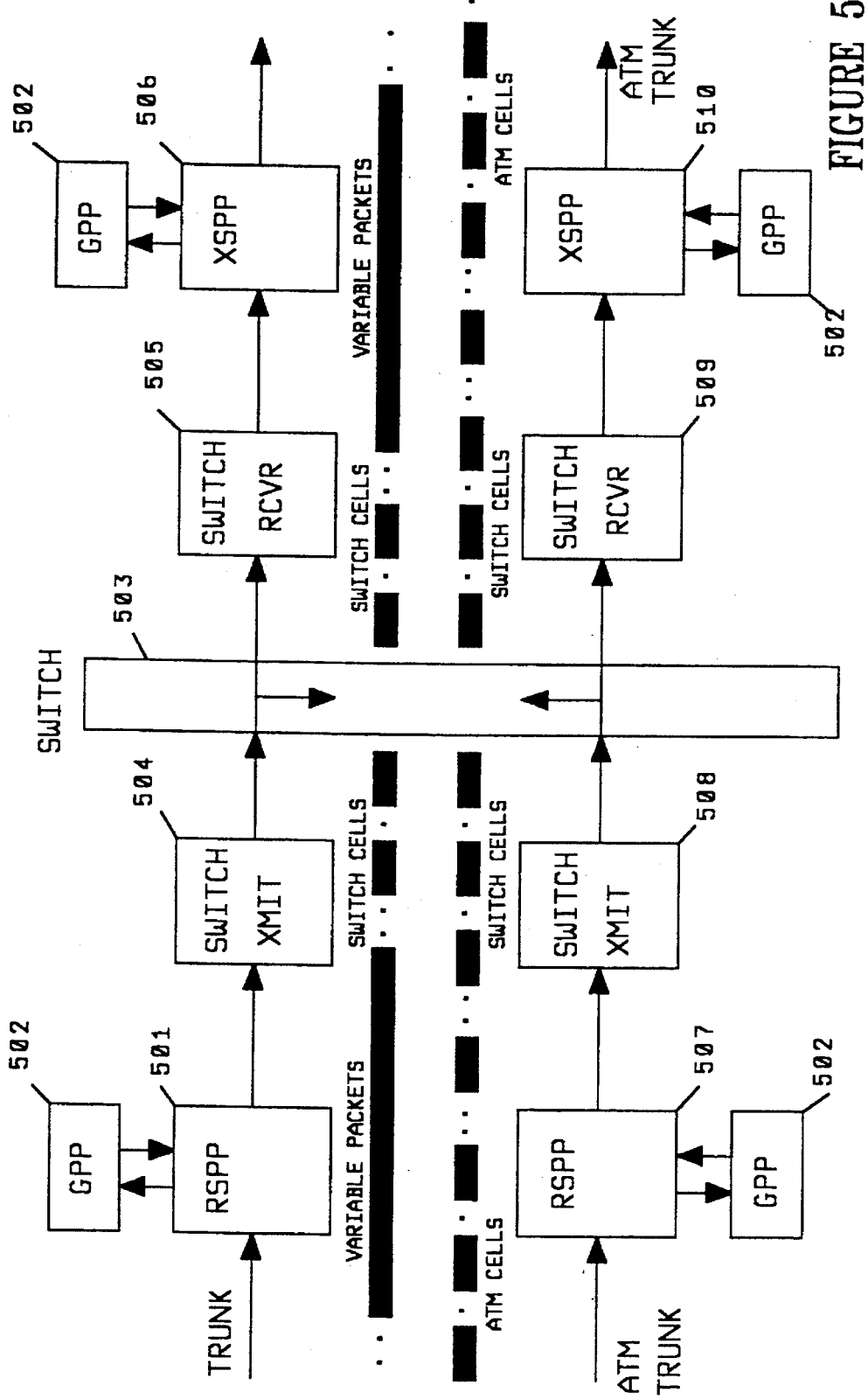
FIG. 5 represents the receive and transmit data flows in a Trunk adapter according to the present invention

The receive and transmit data flows in the Trunk Adapters are represented in FIG. 5. In a proprietary high speed network with packets of variable lengths, the receive process involves the steps of:

1. Line Receiver, Buffer Memory, Specific Purpose Processor (501) system
   a. receiving the packets from the line,
   b. checking the packets header and in case of error discarding the packets,
   c. processing the information contained in the packets header according the routing mode,
   d. routing the control messages towards the General Purpose Processor (GPP, 502)
   e. encapsulating the packets with a specific switch header in function of the destination adapter,
   f. forwarding the packets and the GPP (502) control messages to the Switch Transmitter Adapter (504),
2. Switch Transmitter Adapter (504)
   a. segmenting the packets in cells of fixed length adapted to the Switch (503),
   b. generating an error check field to ensure the integrity, of the switch header during the transmission of the cells over the Switch (503).

The transmit process, as for it, comprises the steps of:
1. Switch Receiver Adapter (505)
   a. receiving the cells from the Switch (503),
   b. checking the switch header and, in case of error, discarding the cell,
   c. reassembling the data packets.
2. Line Receiver, Buffer Memory, Specific Purpose Processor (506) system
   a. forwarding the control packets to the General Purpose Processor (502),
   b. encapsulating the packets with a routing header,
   c. receiving control packets from the GPP (502),
   d. queueing data and control packets in the appropriate queues,
   e. handling the outgoing packets with priority given to real time data (and then to non real time data).

It is possible to design the adapters to work either in a a proprietary environment with packets of variable length, or in a standard mode such as ATM (Asynchronous Transmission Mode) with short cells of fixed length, or in both where appropriate. In this last case, for performance purpose, cells routed on the switch are identical or similar to these defined in the ATM protocol with as result:

the elimination of the packets segmentation and reassembly steps in the Switch Transmitter (508) and Receiver Adapters (509), a simplification of the switch header processing in the Specific Purpose Processor (507, 510).

Adapter Functional Structure

The present invention deals with the relationships between the Line Receiver/Transmitter, the Buffer Memory, the Specific Purpose Processor, and the Switch Adapter and in particular with the handling of the data flow in a way to optimize the throughput and the processing time inside the adapters. More specifically, the invention relates to a very high performance system for queueing and dequeueing the data buffers.

The communication adapters are based on the following principles:

the Specific Purpose Processor is designed minimize the number of operations necessary to manage the steady state data flow.

data packets and control data are managed separately in two distinct memories respectively the Buffer Memory and the Local Memory.

the data packets buffering and the queueing and dequeueing mechanisms are identical for all Ports-Trunk and Receive-Transmit adapters.

According to these considerations, the following conventions will be used to describe the invention:

The device which reads in the Buffer Memory and the device which writes into the Buffer Memory are designated respectively by IO1 and IO2. That means:

in the receive side of the adapter, IO1=Switch Transmitter and IO2=Line Receiver in the transmit side of the adapter, IO1=Line Transmitter and IO2=Switch Receiver.

In the same way:

an input data stream goes from the switch or external line (IO2) to the Buffer Memory.

an output data stream goes from the Buffer Memory to the switch or external line (IO1).

Furthermore:

The meaning of "packet" is application dependent. It may be applied, for example, to an SDLC frame from a Port, to a proprietary packet format from a Trunk, or to a cell received from an ATM Trunk. The term "packet" that will be used in the following paragraphs will not refer to a precise data unit format.

Data Structures

Buffers, Packets, Queues Structures

Figure 6:
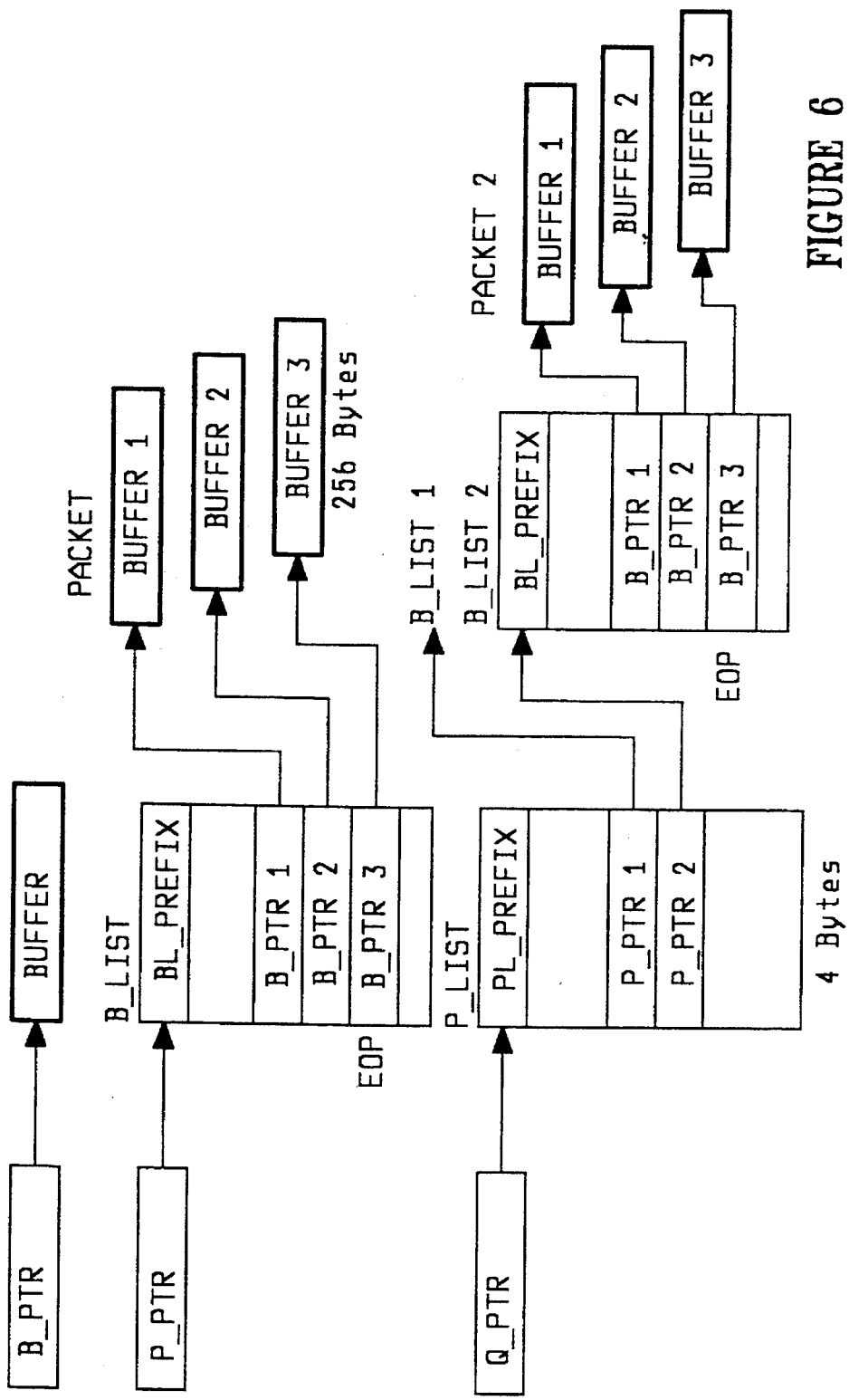
FIG. 6 illustrates the buffer, packet and queue structures according to the present invention.
Figure 7:
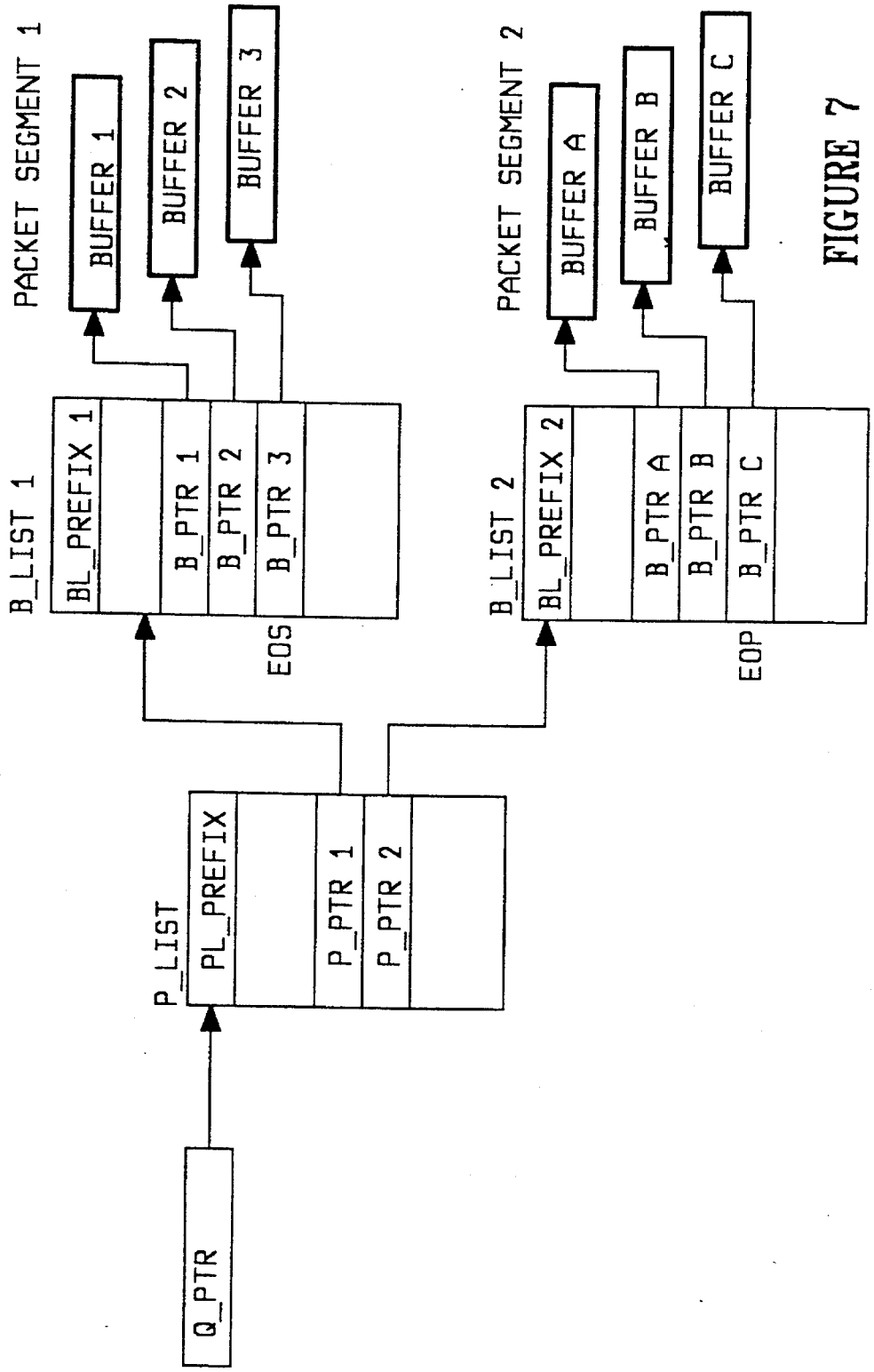
FIG. 7 illustrates the packet segmentation mechanism according to the present invention.

Data packets are stored in the Buffer Memory (BM) while control data are managed directly by the Specific Purpose Processor (SPP) in the Local Memory (LM). The basic unit of memory that can be allocated to an input (Line/Switch Receiver (IO2)) or output device (Line/Switch Transmitter (IO1)) is a buffer of fixed length. As illustrated in FIGS. 6 and 7, each of these buffers is represented in the Local Memory by a pointer called Buffer Pointer (B_PTR). A pointer is a generic term to identify a logical data structure (buffer, packet, queue . . . ) stored in the Buffer Memory. The storage of a packet requires one or several buffers. These buffers are chained together using a list of pointers (B_LIST) which is itself represented by a Packet Pointer (P_PTR). A list of Packet Pointers (P_LIST), identified by a Queue Pointer (Q_PTR), designates a queue of several packets.

List Prefix

Each list, representing a specific packet or a queue structure, is preceded by a Prefix used for storing any type of information related to the data the structure contains. In Buffer Lists, the Prefix (B_PREFIX) contains information related to the routing of the packet:

the packet header the date of the packet reception the packet length

All the processor operations on the packet header are realized in the the Local Memory (LM) without having to access to the data stored in the Buffer Memory (BM). Furthermore, when the processor (SPP) is working on the Local Memory, the DMA operations on the Buffer Memory are not disrupted. The result is a more efficient routing process and memory management.

Packet Segmentation

To facilitate the memory management, the lists used for packets and queues are of fixed length. As represented in FIG. 7, packets which are bigger than the buffer list can contain, are segmented. This method allows the lists (B_LIST) not to be sized at the maximum packet length. The segments (B_LIST 1, B_LIST 2) are identified in the packet list (P_LIST) by means of distinct packet pointers (P_PTR 1, P_PTR 2). The correlation between segments of a same packet is realized through a specific Status Field (SF) located in the last Buffer Pointer (B_PTR) of each segment. This field is flagged EOS (End Of Segment) when the List is full. In an output operation, If Status Field is found equal to End Of Segment (EOS), the next pointer in the packet list (P_LIST) will identify another segment of the same data packet.

If Status Field is found equal to End Of Packet (EOP), the next pointer in the packet list (P_LIST) will identify another data packet.

Buffer Pointers

Figure 8:
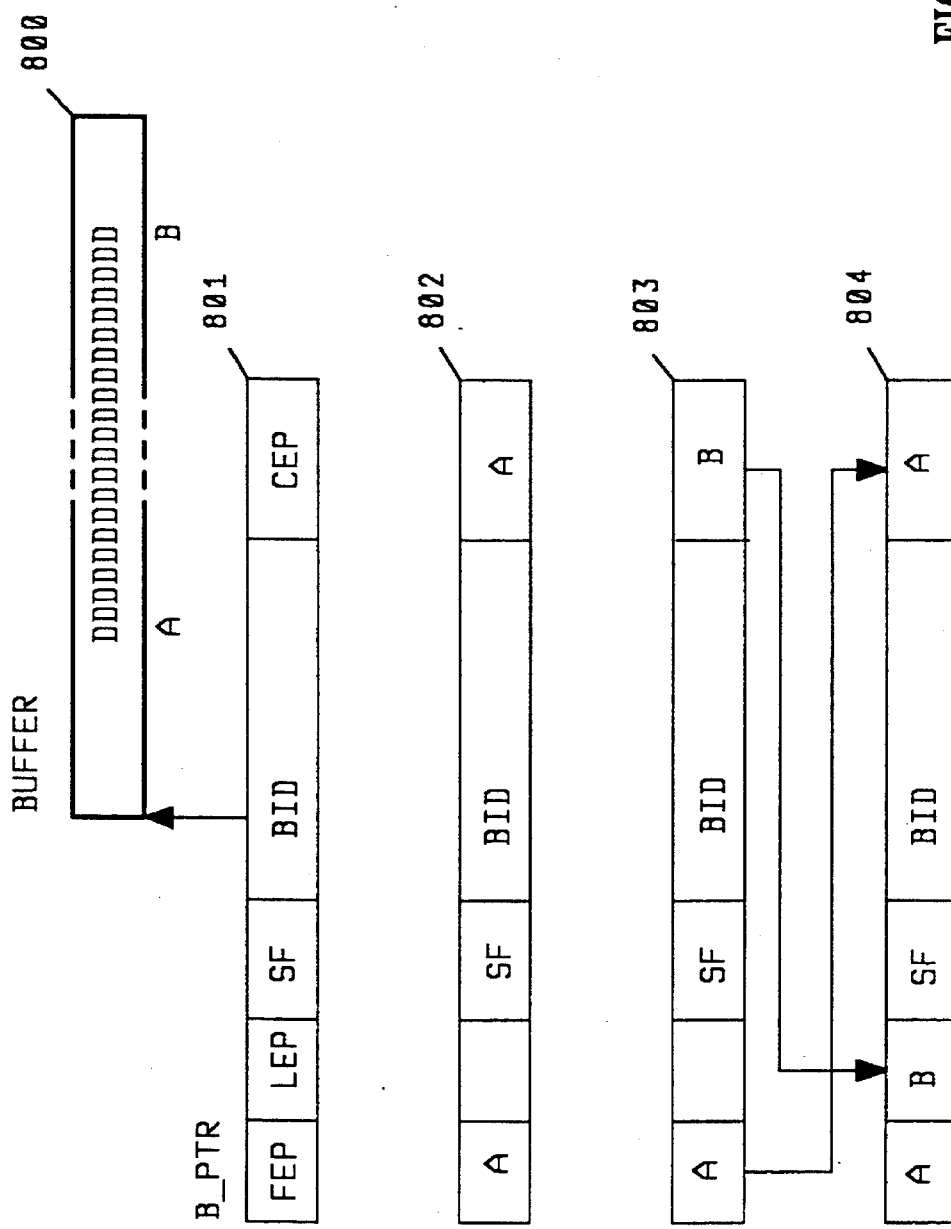
FIG. 8 represents the Buffer Pointer structure according to the present invention.

The FIG. 8 describes the general format of a Buffer Pointer (801). Buffers (800) need not to be full and the data (DDDDDDDD) may start (A) and end (B) at any place. For example, it is possible to reserve the first bytes of a buffer to include a header a posteriori. The data writing and reading is realized by means of five fields located in the Buffer Pointer (801):

the First Element Pointer (FEP) :identification of the first data element in the buffer (data may start at any place), the Last Element Pointer (LEP): identification of the last data element in the buffer (data may end at any place), the Status Field (SF): this field is used in the last Buffer Pointer of a list to designate either an End Of Segment (EOS) or an End Of Packet (EOP), the Buffer IDentifier (BID): identification of the buffer containing the data, the Current Element Pointer (CEP): identification of the current data element to read or to write.

The status of a Buffer Pointer before the data acquisition is such that the Current Element Pointer (CEP) is set equal to the First Element Pointer (FEP=CEP=A) (802). The Current Element Pointer is incremented each time a new element is stored. At the end of the acquisition, the Current Element Pointer designates the last data (CEP=B) (803). For a subsequent processing, the Current Element Pointer value (CEP=B) is then written in place of the Last Element Pointer (LEP) and afterwards reset to its initial value (CEP=FEP=A) (804). This method allows the transmission of the data in the order in which they were received.

List Pointers

Figure 9:
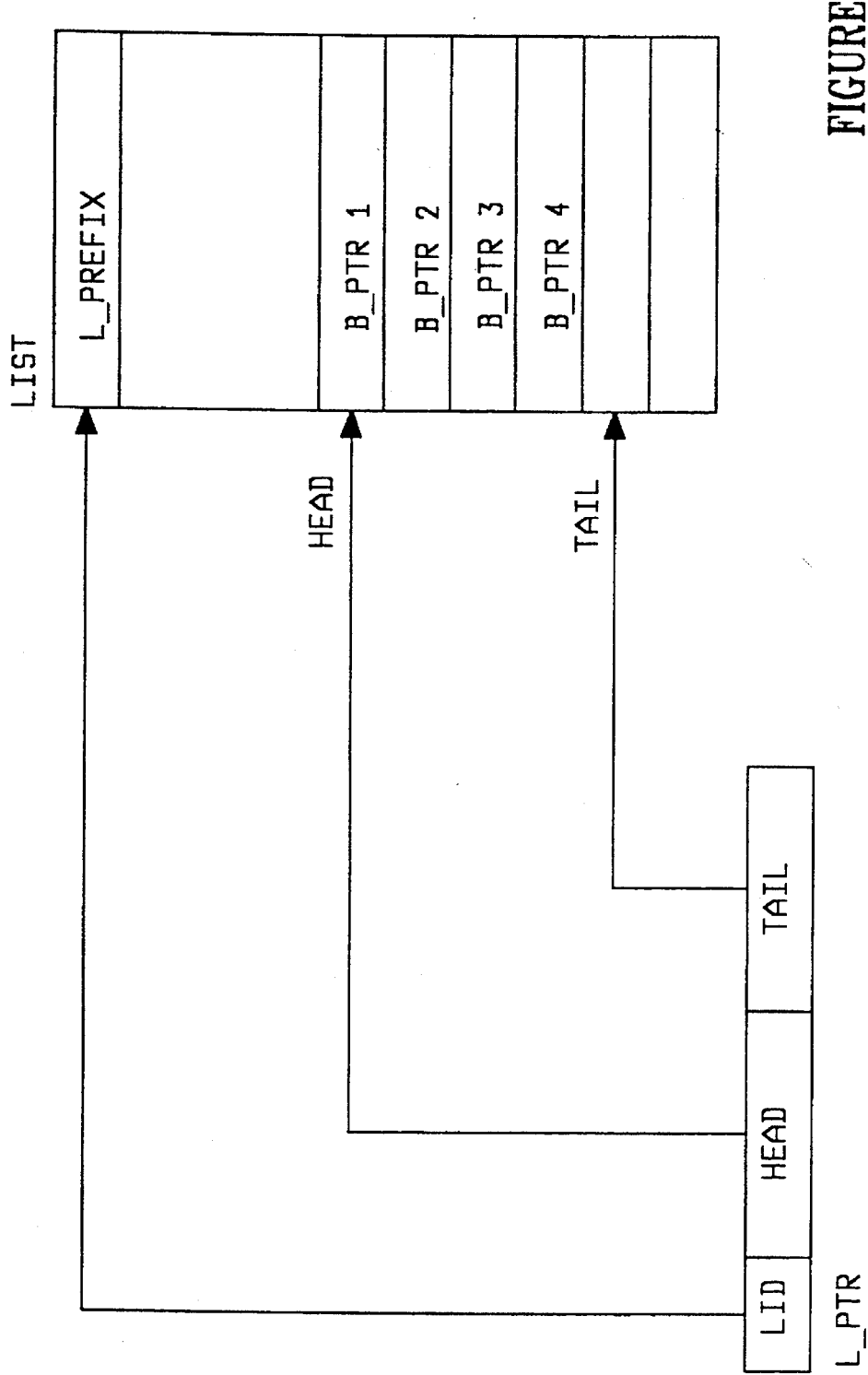
FIG. 9 represents the List Pointer structure according to the present invention.

Referring to FIG. 9, the List Pointer format consists of three fields:

the List IDentifier (LID): identification of the list, the HEAD: identification of the first pointer of the list, the TAIL: identification of the next pointer to attach to the list.

Free Buffer List (FBL)

Figure 12:
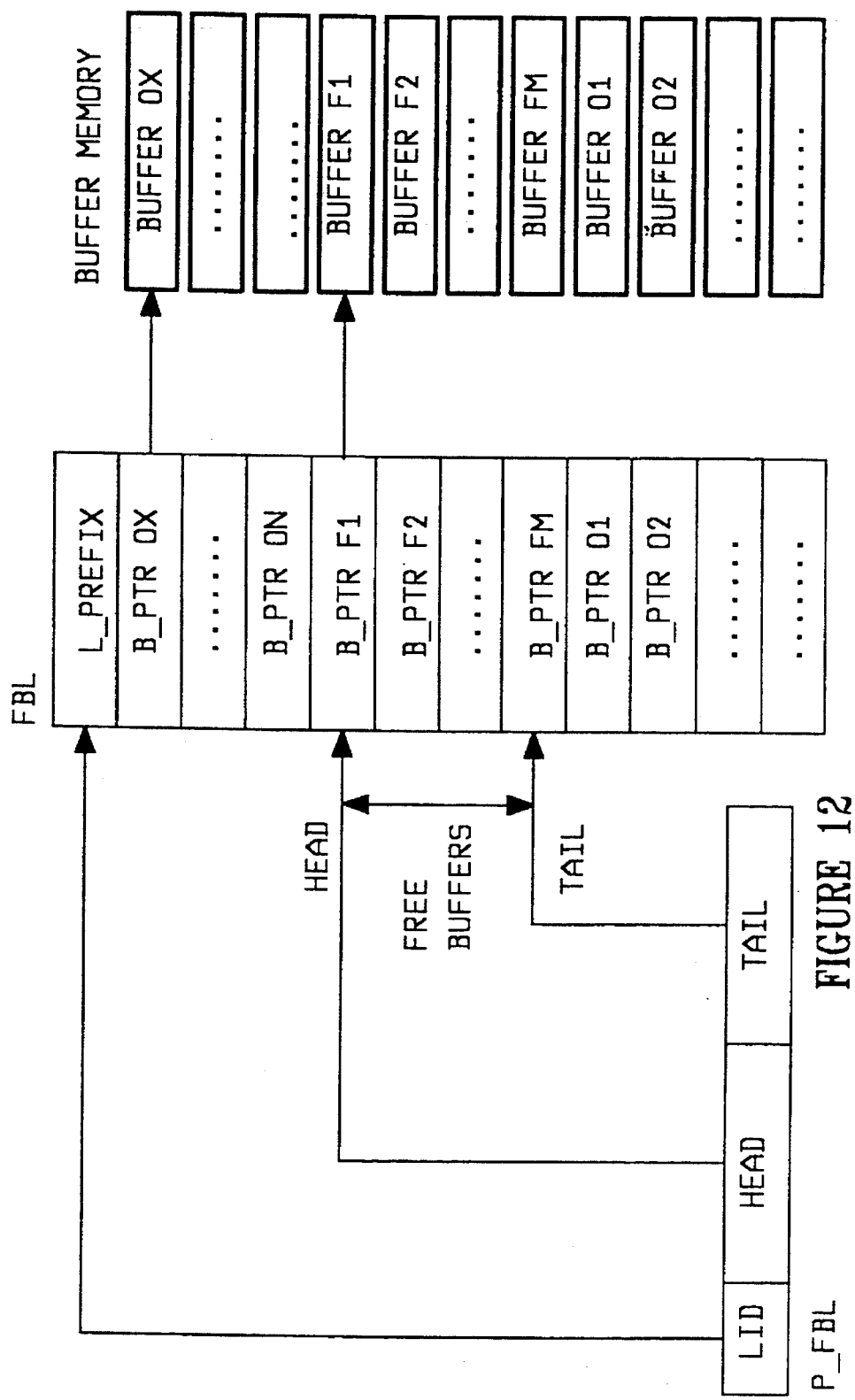
FIG. 12 represents the Free Buffer List structure according to the present invention.

The management of the Buffer Memory is realized by means of a specific list called Free Buffer List (FBL). The FBL comprises the totality of the Buffer Pointers and its role is to provide a status of the memory occupation (FIG. 12) using the HEAD and TAIL fields of the Free Buffer List Pointer (P_FBL):

T: total number of buffers in the Buffer Memory.

HEAD: identification of the first free buffer of the list. Each time a new buffer is filled, the HEAD field is incremented.

TAIL: identification of the next free buffer of the list. Each time a new buffer is released, the TAIL field is incremented.

HEAD=TAIL :the Buffer Memory is full.

Incremented TAIL=HEAD: the Buffer Memory is empty.

The Free Buffer List (FBL) is created at initiation time and is permanent contrary to other lists which are created dynamically (Buffer, Packet or Queue Lists).

Note: in general, when a lack of resources is detected (Free Buffer List empty), then the packet which cannot be stored in the Buffer Memory is discarded.

Specific Purpose Processor Structure

Figure 13:
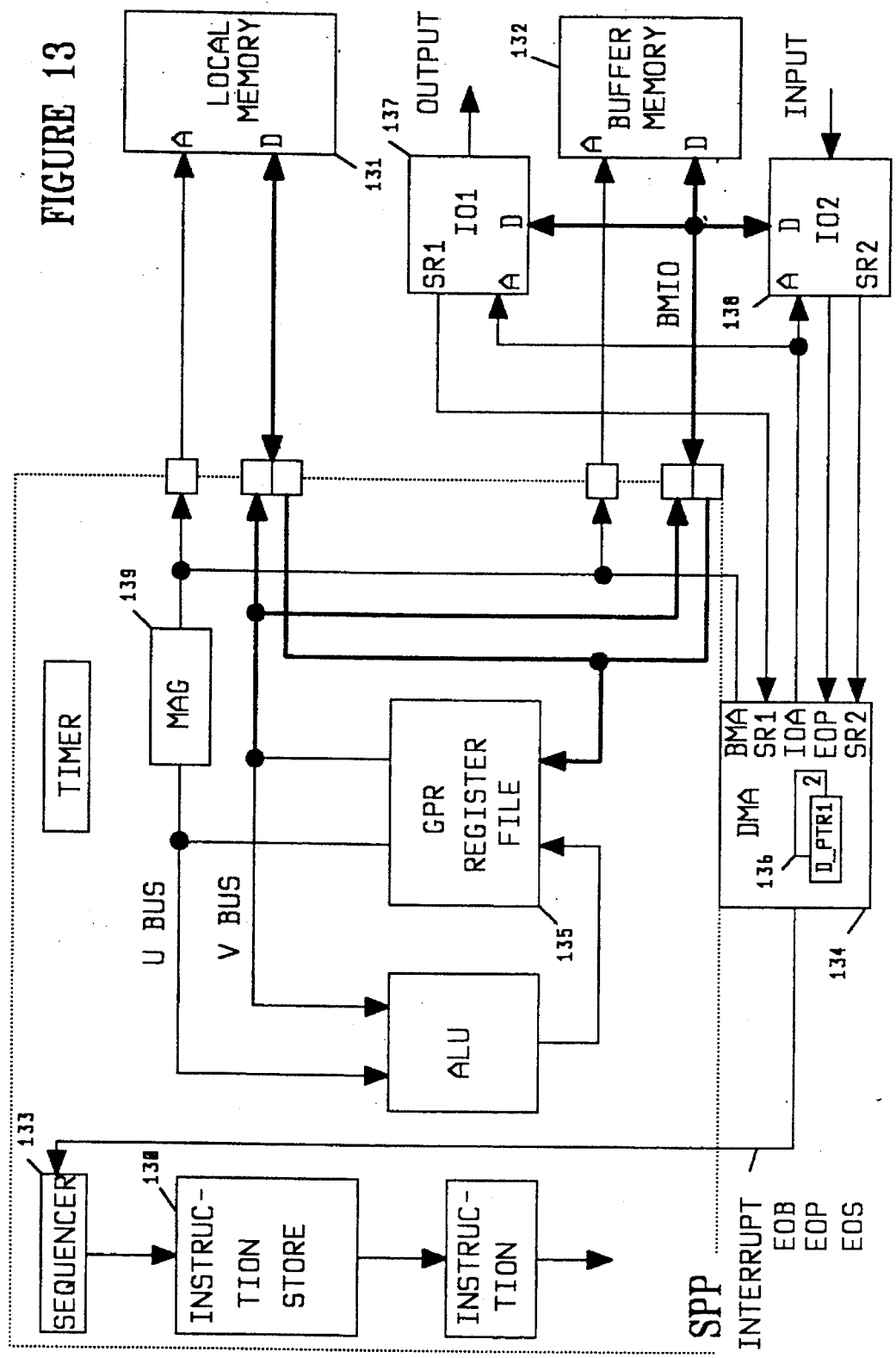
FIG. 13 represents the Processor functional structure according to the present invention.

The Specific Purpose Processor functional structure is illustrated in FIG. 13.

Processor Parallel processing

The Specific Purpose Processor is designed to execute up to three operations in parallel:

1. ALU (Arithmetical and Logical Unit, 140) operations on registers
2. Memory operations
3. Sequence operations The parallelism requires to distinguish instructions from operations:

Instruction: it is the content of the code word. In term of assembler language, the instruction corresponds to one line of code. All instructions are executed in one processor cycle Operation: an instruction may be composed of one or more operations which are executed simultaneously.

Memory Space

The SPP memory space is divided in three blocks:

the Instruction Store (130),

The Local Memory (LM, 131), which is the code working space,

The Buffer Memory (BM, 132) which is the repository for data packets when they pass through the adapter.

They all operate in parallel, the Instruction Store (130) under control of the Sequencer (133), the Local Memory under control of the processor code and the Buffer Memory (132) under the control of the Direct Access Memory (DMA, 134)).

Registers

The registers are divided in two categories:

1. the General Purpose Registers (GPR) These registers are located in the Register File (RF, 135) and are available as instruction operands.

2. the Control Registers (CR)

The CR's are hardware registers which are used in specific functions and are available also as instruction operands. However, there are less degree of freedom in their use, as compared with the GPR's. In particular, two of these control registers (136) are located in the Direct Access Memory (DMA, 134).

CR1=D_PTR1 (DMA Pointer IO1)

CR2=D_PTR2 (DMA Pointer IO2)

DMA Pointers 1 and 2 are associated to input/output IO1 (137) and IO2 (138) and they both contain the current Buffer Pointer (B_PTR).

Memory Address Generator (MAG, 139)

In all load or store operations, on the Local or on the Buffer Memory, the physical address is reconstituted from the different fields of Buffer or List Pointer, used as operand. For performance reason, this operation is realized by a specialized hardware component called Memory Address Generator (MAG, 139).

Direct Memory Access Controller (DMA, 134))

The use of a Direct Memory Access Controller (DMA, 134) jointly with a processor is well-known in the state of the art. Its role is to quickly move the data packets between the IO devices (137, 138) and the Buffer Memory (132) without the processor (SPP) intervention. The DMA module consists of two independent programmable channels. The IO devices present their service requests (SR1, SR2) to the DMA which controls the access to the Buffer Memory (132). The processor intervention is needed only at buffer and packet boundaries. The data streams between the two IO devices and the Buffer Memory is processed in parallel with the code. Up two IO operations can be multiplexed on the BMIO bus; one with IO1 and the other with IO2. For that the DMA manages the two DMA Pointers (D_PTR1 and D_PTR2) which are nothing else than Buffer Pointers.

Input Output Subsystems

The Specific Purpose Processor (SPP) is considered as the "master" and it establishes the connections.

The IO devices and the Buffer Memory are controlled either directly by the processor code, or via the DMA.

The code intervention can be forced by the IO devices via the Interrupt mechanism in case of buffer or packet boundary.

Data Processing

Various processing can be made on Buffer and List Pointers:

Incrementing a Buffer Pointer,

Closing a buffer,

Accessing a List Prefix,

Attaching an element to a list,

Detaching an element from a list.

Operations on Pointers

Some operations on pointers are performed by the processor code, others by the Direct Memory Access (DMA).

The writing and reading of the Buffer Pointers is exclusively the fact of the DMA (134).

The writing in the Buffer Memory:

At the reception of a service request (SR2) from an IO2, the DMA has access to the Buffer Memory (132) by means of the address contained in the Pointer 2 (D_PTR2, 136). The DMA Pointer 2 is provided by the processor (SPP) and is nothing else than a Buffer Pointer (B_PTR). The DMA orders simultaneously the IO2 (138) to present a data element on the BMIO bus and the Buffer Memory (132) to write this data element at the Current Element Pointer CEP) position in the buffer identified by the BID (Buffer IDentifier) field in the DMA Pointer. Data are filled into the buffer starting an address chosen by the code and ending at the bottom of the buffer except the last buffer (of a packet) where data may end at any place. Before starting the input operation, the FEP (First Element Pointer) and the CEP (Current Element Pointer) fields in DMA Pointer are both on the first data position. There is no alignment constraints. The Current Pointer (CEP) is incremented each time new data element is stored. When the buffer is full, the DMA demands from the processor a new Buffer Pointer through an interrupt mechanism (IO2_EOB routine). A similar procedure is used when the IO2 detects the end of a packet (IO2_EOP routine)). After the data acquisition, the Current Element Pointer (CEP) is reset to the first data position (CEP=FEP).

The Reading in the Buffer Memory:

At the reception of a service request (SR1) from an IO1, the DMA addresses the Buffer Memory (132) by means of the BID field (Buffer IDentifier) contained in the DMA Pointer 1 (D_PTR1, 136). The DMA Pointer 1 is provided by the processor (SPP). The DMA orders simultaneously the Buffer Memory (132) to present on the BMIO bus a data element at the Current Element Pointer position in the buffer identified by the BID field of the DMA Pointer and the IO1 device (138) to read this data element. Before starting the output operation, the FEP (First Element Pointer) and the CEP (Current Element Pointer) fields in DMA Pointer are both on the first data position. The Current Pointer (CEP) is incremented each time new data element is transferred. The buffer is empty when the Current Element Pointer value is equal to the Last Element Pointer value. At that time, the DMA demands a new Buffer Pointer from the processor through an interrupt mechanism (IO1_EOB routine). A similar procedure is used when the DMA detects a end of a segment or packet (IO1_EOS or IO1_EOP routine). After the data transfer, the Buffer Pointer is released in the Free Buffer List, Packet List and Queue List are updated accordingly.

Packet and Queue Pointers are managed by the processor code:

- the code intervention is forced by the IO devices and DMA via the Interrupt mechanism in case of buffer or packet boundary.
- the buffer and packet queueing and dequeueing mechanisms are executed under the control of the processor in the Local Memory.

Interrupts

The Interrupt mechanism is the way real time is supported by the Specific Purpose Processor (SPP). An Interrupt is a break, due to particular events, in the normal sequence of the processor code. The events which can cause this Interrupt are the service requests from the IO devices associated with specific conditions such as end of buffer, end of packet . . . At each specific Interrupt corresponds a specific routine which cannot be interrupted by another routine. It is very important to have interrupt routines as short as possible to avoid overrun/underrun problems.

1. The following Interrupts are used by the Line and Switch Transmitters IO1).

IO1_EOB:

Condition: when serving an output IO1, the DMA has emptied a buffer (which is not the last buffer of the packet/segment—the Buffer Pointer is not flagged EOS or EOP) the DMA Pointer (D_PTR1) raises a IO1_EOB interrupt which triggers a IO1_EOB routine.

Routine: this routine releases the pointer of the just emptied buffer in the Free Buffer List. A new pointer is dequeued from the Output Buffer List (OB_LIST) and passed to the DMA Pointer (D_PTR1).

IO1_EOP:

Condition: when serving an output IO1, the DMA has emptied a packet (the last buffer of a packet which pointer contains the EOP flag ON), the DMA Pointer (D_PTR1) raises a IO1_EOP interrupt which triggers a IO1_EOP routine.

Routine: the routine:

releases the current and last Buffer Pointer of the Output Buffer List (OB_LIST) in the Free Buffer List (FBL).

detaches the current Output Packet Pointer (OP_PTR) from the Output Packet List (OP_LIST).

dequeues the next packet and its pointer from the Output Packet List

IO1_EOS:

Condition: when serving an output IO1, the DMA has emptied a segment (the last buffer of a packet segment which pointer contains the EOS flag ON and the EOP flag OFF), the DMA Pointer (D_PTR1) raises a IO1_EOS interrupt which triggers a IO1_EOS routine.

Routine: this routine:

releases the pointer of the just emptied EOS buffer in the Free Buffer List (FBL).

detaches the pointer of the just emptied packet in the Output Packet List.

dequeues the pointer of the next segment from the Output Packet List.

2. These Interrupts are used by the Line and the Switch Receiver (IO2).

IO2_EOB:

Condition: when serving an input IO2, the DMA has detected a Buffer Full condition (That buffer is not the last buffer of a packet), the DMA Pointer (D_PTR2) raises a IO2_EOB interrupt which triggers a IO2_EOB routine.

Routine this routine:

stores the pointer of the just filled up buffer in a pre-allocated Input Buffer List (IB_LIST) where all buffers of the same packet are chained.

updates the Input Buffer List prefix area (IBL_PREFIX).

provides the DMA Pointer (D_PTR2) with a new Buffer Pointer for continuing the reception of the data of the same packet. Free Buffer Pointers are managed by the Free Buffer List (FBL).

when for the same packet, the Buffer List is full, the segmentation takes place.

IO2_EOP:

Condition: when serving an input IO2, the DMA has completed the reception of a packet (the last buffer of the packet which pointer is flagged EOM by the hardware), the DMA Pointer raises a IO2_EOP interrupt which triggers a IO2_EOP routine. The code intervention is required to provide a new Buffer Pointer for the reception of a new packet.

Routine: this routine:

stores the pointer of the last filled buffer in a pre-allocated Input Buffer List (IB_LIST) where all buffers of the same packet are automatically chained. The last Buffer Pointer of a packet is flagged EOP by the DMA Pointer (D_PTR2).

updates the Input Buffer List prefix area (IBL_PREFIX).

the Packet Pointer of the Input Buffer List is queued in the Input Packet List (IP_LIST).

provides the DMA Pointer (D_PTR2) with a new Buffer Pointer (B_PTR) for the reception of the next packet.

Queuing and Dequeuing Operations

The process of attaching and detaching, object of the present invention, involves the following operations:

LIN RA,RT: List IN

LOUT RA,RT: List OUT

LLEH RA,RT: Load List Element HEAD

STLET RA,RB: Store List Element TAIL

GOTO (COND,)ADDR: Go to an immediate ADDRess ALU operations on registers

1. LIN RA,RT (FIG. 10)

The LIN (List IN) operation increments the TAIL field of the List Pointer referenced by RA and stores the result into the register referenced by RT. If the list is full, the RA contents is stored into RT without change. LIN is usually used in conjunction with the STLET memory operation to attach an element to a list in the TAIL position. In that case RT=RA. The list full indicator (F) is updated as follows:

IF INCREMENTED (TAIL)=HEAD then set F=1 (List full) else set F=0

A list full condition detected on the LIN operation does not prevent the execution of the STLET. However the list integrity is not destroyed.

Example: let's consider a 16 element list (elements of 4 bytes) located at address '001800'. It contains six elements, its HEAD address is '001820', its TAIL address is '001838'; so its List Pointer is '00182038' with (as example):

2 bytes: List IDentifier (0018)

1 byte: HEAD (20)

1 byte: TAIL (38)

(0 a 1 bits: list size 6 bits spare (0), 8 a 23 LID, 24 a 27 HEAD, 28 a 31 TAIL, LID sur 12 bits+4 bits a 0). It is supposed to be held in R20. The operation LIN R20,R20 returns '0018203C'. If a second operation LIN R20,R20 was performed (assuming no element has been detached by a LOUT operation in the mean time), it would return '00182040'.

2. LOUT RA,RT (FIG. 11)

The LOUT (List OUT) operation increments the HEAD field of the List Pointer referenced by RA and stores the result into the register referenced by RT. If the list is empty, that means if the HEAD is equal to the TAIL field, the RA contents is unchanged. The list empty indicator (E) is up-dated as follows:

IF TAIL=HEAD then set E=1 (List empty) else set E=0

LOUT is usually used in conjunction with the LLEH memory operation to detach the HEAD element of a list. In that case RT=RA.

Example: let's consider a 16 element list located at address '003400' containing 5 elements. Its HEAD address is '003438' and its TAIL address is '00341C'. So its List Pointer is '0034381C'. It is supposed to be held in R30. The operation LOUT R30,R30 returns '00343C1C'. If a second operation LOUT R30,R30 was performed (assuming no element has been attached by a LIN operation in the mean time), it would return '0034401C'.

Memory Operations

1. LLEH RA,RT

The LLEH (Load List Element Head) operation moves the HEAD element from the list referenced by RA to the RT register. LLEH is usually used in conjunction with LOUT operation to detach an element (Buffer or List Pointer) from the HEAD of a list. When used in conjunction LOUT, RT must not be equal to RA and the register pointed by RA must be the same as that of LOUT.

Example: let's consider a 16 element list located at address '003400' containing 5 elements. Its HEAD address is '003438' and its TAIL address is '00341C'. So its list pointer is '0034381C'. It is supposed to be held in R30. The operation LLEH R30,R40 returns the contents of the Local Memory location '003438' into R40.

2. STLET RA,RB

The STLET (Store last Element Tail) operation stores the element referenced by RB into the list referenced by RA at the TAIL position RA and RB are List Pointers.

STLET is usually used in conjunction with LIN (List IN) to attach an element to the TAIL of a list.

Example, let's consider a 16 elements list located at address '003400' containing 5 elements. Its HEAD address is '003438' and its TAIL address is '00341C'. So its List Pointer is '0034381C'. It is supposed to be held in R30. The operation STLET R30,R40 writes the contents of R40 into Local Memory location '00341C'.

Note:

a. STLET can be used, without LIN, to modify the pointer of the last buffer of a packet.

b. If an element is attached to a full list, the list full condition (F=1) which is detected by the LIN operation, does not prevent the execution of the STLET operation. However, the store alters a non significant list element.

Sequence operations

The condition indicators set by the LIN and LOUT operations:

E List Empty

F List Full reflect a processor state which can be tested in the same instruction or later by a conditional sequence operation.

1. GOTO (COND,)ADDR

If the tested condition (if any) is met, the new code address is given by the ADDR operand. If not the code proceeds in sequence.

Typical Instructions

Figure 14:
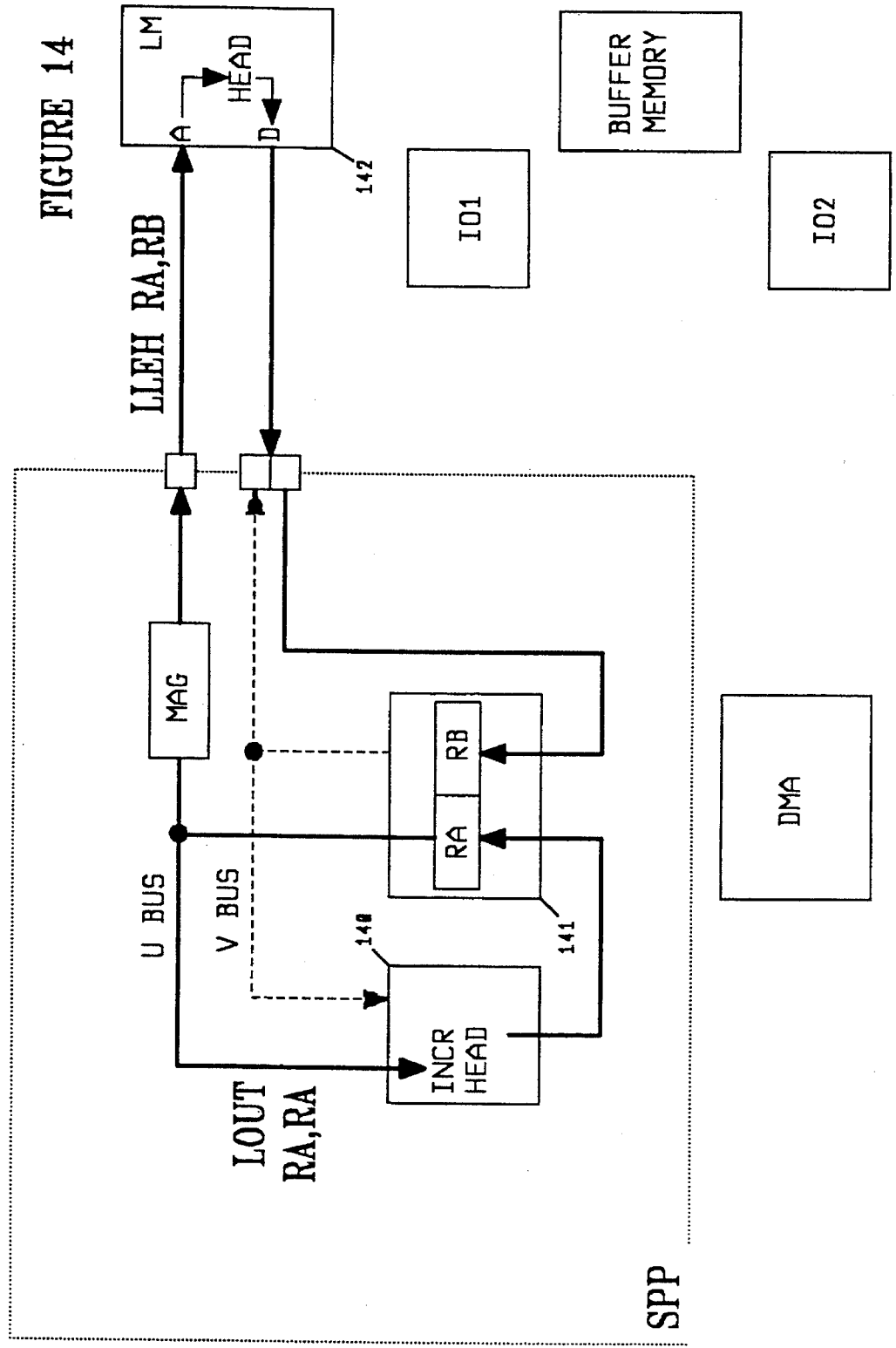
FIG. 14 illustrates the dequeueing mechanism according to the present invention.

The following instruction allows to detach an element (Buffer or List Pointer) from the HEAD of a list, the List Pointer being given by RA (FIG. 14):

LOUT RA,RA LLEH RA,RB

The LOUT (ALU operation 140) increments the HEAD field of the List Pointer referenced by RA (Register File 141) (The RA register is updated with the new HEAD value at the next clock signal). Simultaneously, the HEAD element of the list referenced by RA is moved from the Local Memory (142) to the register RB (141) by means of the memory operation LLEH.

Figure 15:
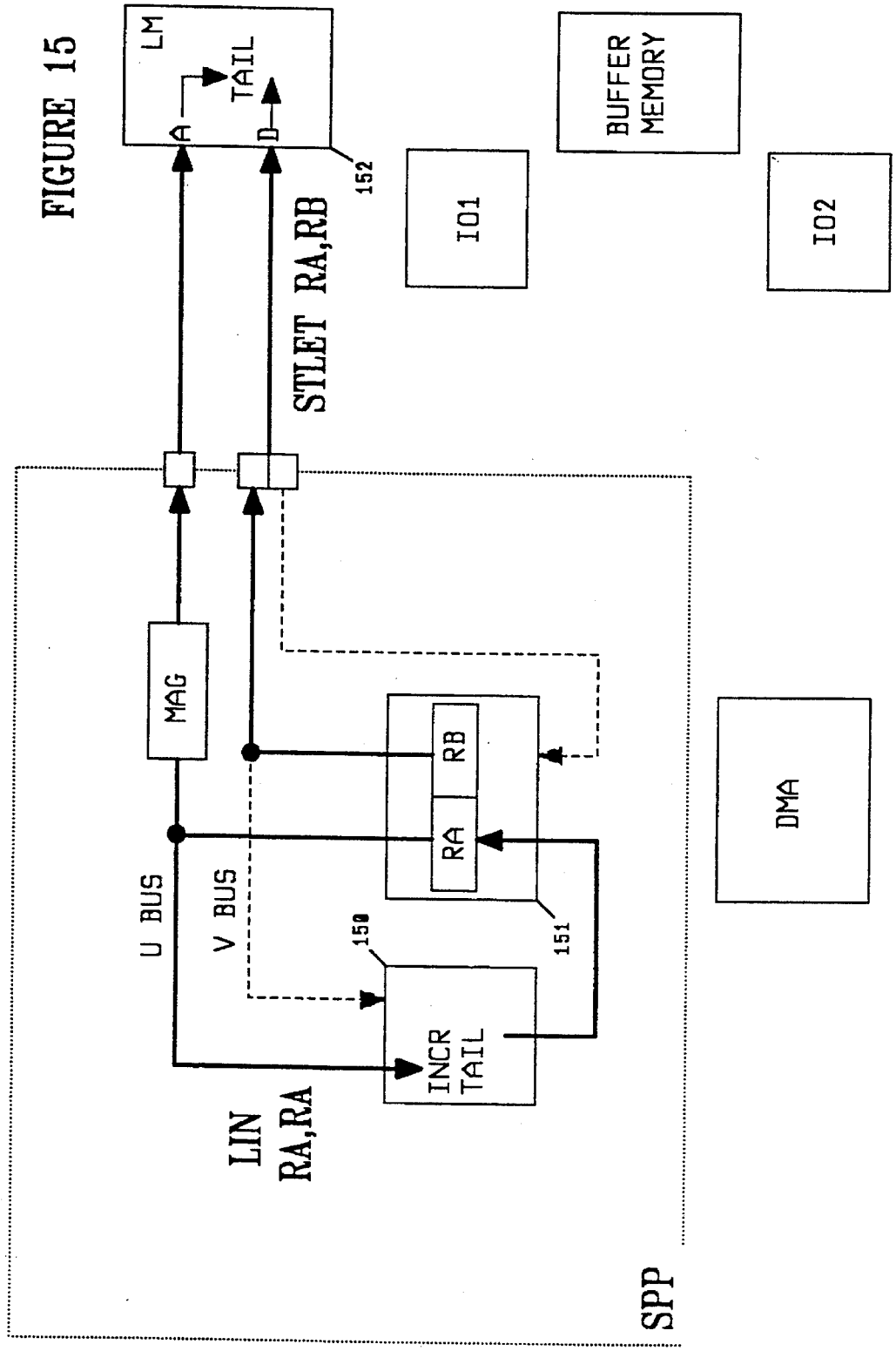
FIG. 15 illustrates the queueing mechanism according to the present invention.

The following instruction allows to attach an element (Buffer or List Pointer) given by RB to the TAIL of a list, the List Pointer being given by RA (FIG. 15):

LIN RA,RA STLET RA,RB

The LIN (ALU operation 150) increments the TAIL field of the List Pointer referenced by RA (Register File 151). (The RA register is updated with the new TAIL value at the next clock signal). Simultaneously, the TAIL element of the list referenced by RA is moved from the register RB to the Local Memory (152) by means of the memory operation STLET.

The following instruction allows to release a buffer (its pointer being given by RB) to the TAIL of the Free Buffer List, the pointer of which is given by RA:

LIN RA,RA STLET RA,RB

Queueing & Dequeueing Cycles

Figure 16:
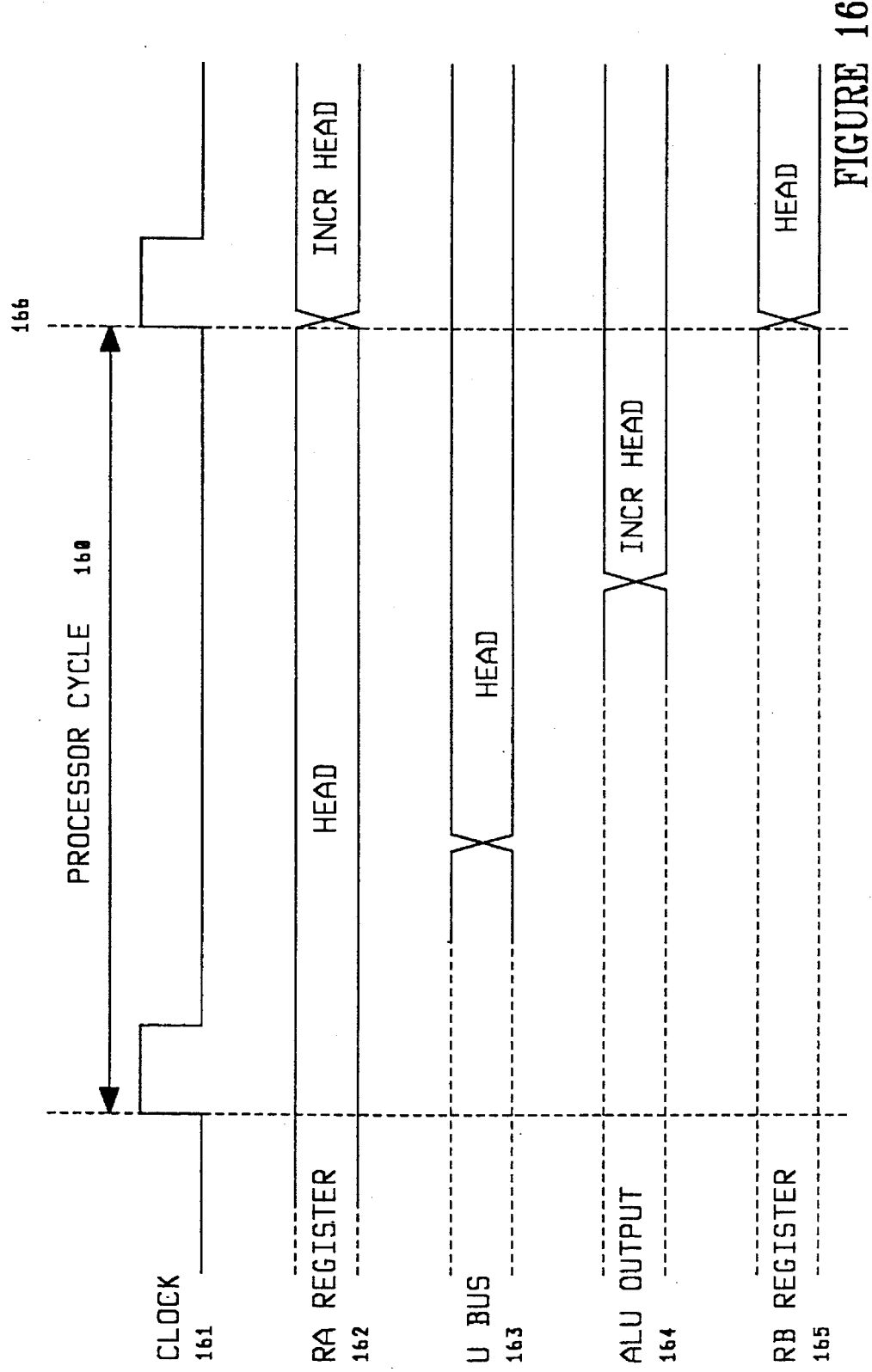
FIG. 16 shows a simplified view of a dequeueing cycle according to the present invention.

FIG. 16 shows a simplified view of the dequeueing cycle. As detailed in previously, the detach instruction requires two operations (LOUT and LLEH) which are processed in parallel. Within the same processor cycle (160, 161), the contents of the RA register (162) used as input operand is applied simultaneously to the ALU and to the Local Memory by means of the U Bus (163). The ALU increments the HEAD field of the pointer. The register RA (162) and RB (165) are updated respectively with the new pointer value and the HEAD element at the clock signal (166). The queueing process is similar.

Performance

The throughput of a communication adapter is defined as the total time required to handle a data packet from the input to the output. However, the packet size being application dependent, two measures are currently used to evaluate the performances of adapters:

first, the number of packets of fixed length the adapter is able to handle in a second (packet throughput), second, the number of bits per second the adapter is able to transmit in case of infinite packet length (data throughput).

The performances depend on the hardware and on the processor capabilities but the main throughput limiting factor is the packet processing time and this processing time is directly related to the number of instructions required to handle a packet. The operations on the packets can be divided in two categories:

the buffering process with the interrupt routines. This operation is generic for all adapter types. The processing time required for this operation is directly proportional to the packet length.

the background process with the operations of routing, assembling—disassembling, formatting of the packets, management of the bandwidth, priority, . . . This process is designed according to the adapter function, but in the same application, the background process is identical for all packets independently of their size.

The interrupt routines are the way real time is supported by the processor. They must be as short as possible to avoid the overrun on the input device (IO1) and the underrun on the output device (IO1). They commands the performance of the adapter in term data throughput (bits per second). For packets of infinite length, the background process disappears and the throughput bottleneck is the DMA. The DMA response time, which depends of the interrupt response time, is optimized by means of the queuing and dequeueing operations objects of the present invention.

In another way, to maximize the packet throughput (number of packets per seconds that the adapter is able to transmit), the number of instructions required by the background process must be reduced to a minimum. As in the previous case, the queueing and dequeueing operations are optimized by means of the present invention (only one processor cycle or instruction). Furthermore, the particular data organization between the different memory entities contributes to an efficient manipulation of the packets.

We claim:

1. A line adapter (401, 402) for a switching node (300) in a packet communication network (200) including:

a programmable processing means (SSP) for receiving (138) and transmitting (137) data packets of fixed or variable length;

memory means having a plurality of buffers (132, 800) for storing said data packets and a separate area (131) for working storage;

means for identifying said data packets in said buffers including;

buffer pointers (B_PTR) each identifying one of the said data packet buffers, said buffer pointers including a status field for indicating when the pointed to buffer contains the end of a packet (EOP) or the end of a segment (EOS), a free buffer list (FBL) and an associated free buffer list pointer (P_FBL) for identifying said list, said list including indicia indicating buffers which are free and available for use in storing packets, buffer lists (B_LIST) each including a plurality of buffer pointers (B_PTR) each identifying a buffer in the memory in which packet data is stored, packet pointers (P_PTR) for identifying a said buffer list (B_LIST), at least one list of packet pointers (P_LIST), and queue pointers (Q_PTR) for identifying a said packet pointer list (P_LIST);

means responsive to the detection of the end of segment (EOS) status for correlating buffers of the same packet having buffer pointers (B-PTR) in different buffer lists (B-LIST), whereby buffer lists (B-LIST) can be of uniform size or smaller than needed to accommodate the largest packet;

means (FIG. 15) for listing said identifying means in said working storage (131) in a single instruction;

means (FIG. 14) for delisting said identifying means in said working storage in a single instruction; and, means responsive to the delisting of a buffer for modifying the indicia in the free buffer list (FBL) to indicate the availability of the buffer.

2. The programmable adapter set forth in claim 1 in which each of the lists includes a prefix for storing information related to the data included in the list.

3. The programmable adapter set forth in claim 2 in which the said buffer list prefix includes control and routing information from the header of the stored data packet.

4. The programmable adapter set forth in claim 3 in which the listing and delisting means can have up to three operations executing in parallel.

5. The programmable adapter set forth in claim 1 in which said list pointers include:

a first field identifying the list (LID);

a second field identifying where (TAIL) to attach a pointer to the list; and, a third field identifying the first pointer (HEAD) in the list.

6. The programmable adapter set forth in claim 1 in which each buffer pointer includes in addition to said status field:

a first field for identifying a buffer (BID);

a second field for identifying the first data element (FEP) in said buffer;

a third field for identifying the last data element (LEP) in said buffer; and, a fourth field for identifying a current data element (CEP) in said buffer.

7. The programmable adapter set forth in claim 6 in which:

the buffer lists are of fixed length;

the buffer pointers can be chained in a plurality of buffer lists when a stored data packet requires more buffers than a single fixed length buffer list can accommodate; and, said status indicator is set in the last buffer pointer of each buffer list to ensure a correlation between the different lists of the said data packet.

8. A method of handling data packets in a line adapter (401, 402) for a switching node (300) in a packet communication network (200) which includes a memory, a programmable processing means (SSP) for receiving (138) and transmitting (137) data packets of fixed or variable length, said method including the following steps:

dividing said memory into a plurality of buffers (132, 800) for storing said data packets and a separate area (131) for working storage;

establishing pointers and lists in the working storage for identifying said data packets in said buffers including;

buffer pointers (B_PTR) each identifying one of the said data packet buffers, said buffer pointers including a status field for indicating when the pointed to buffer contains the end of a packet (EOP) or the end of a segment (EOS), a free buffer list (FBL) and an associated free buffer list pointer (P_FBL) for identifying said list, said list including indicia indicating which buffers are free and available for use in storing packets, buffer lists (B_LIST) each including a plurality of
buffer pointers (B_PTR) each identifying a buffer in
the memory in which packet data is stored, packet pointers (P_PTR) for identifying a said buffer
list (B_LIST), queue pointers (Q_PTR) for identifying a said packet
pointer list (P_LIST);

detecting the end of segment (EOS) status for correlating
buffers of the same packet having buffer pointers
(B-PTR) in different buffer lists (B-LIST), whereby
buffer lists (B-HST) can be of uniform size or smaller
than needed to accommodate the largest packet;

listing said identifying means (FIG. 15) in said working
storage (131) in a single instruction;

delisting said identifying means (FIG. 14) in said working
storage in a single instruction; and, modifying the indicia in the free buffer list (FBL) to
indicate the availability of the buffer following the
delisting of a buffer.

9. The method set forth in claim 8 in which each of the lists includes a prefix for storing information related to the data included in the list.

10. The method set forth in claim 9 in which the said buffer list prefix includes control and routing information from the header of the stored data packet.

11. The method set forth in claim 8 in which the listing and delisting step can have up to three operations executing in parallel.

12. The method set forth in claim 8 in which said list pointers include:

a first field identifying the list (LID);

a second field identifying where (TAIL) to attach a pointer to the list; and, a third field identifying the first pointer (HEAD) in the list.

13. The method set forth in claim 8 in which each buffer pointer includes in addition to said status field:

a first field for identifying a buffer (BID);

a second field for identifying the first data element (FEP) in said buffer;

a third field for identifying the last data element (LEP) in said buffer; and, a fourth field for identifying a current data element (CEP) in said buffer.

14. The method set forth in claim 13 in which:

the buffer lists are of fixed length;

the buffer pointers can be chained in a plurality of buffer lists when a stored data packet requires more buffers than a single fixed length buffer list can accommodate; and, said status indicator is set in the last buffer pointer of each buffer list to ensure a correlation between the different lists of the said data packet.

* * * * *